(12) United States Patent
Ando et al.

(10) Patent No.: US 12,153,241 B2
(45) Date of Patent: Nov. 26, 2024

(54) OPTICAL MEMBER

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Hiroshi Ando, Nisshin (JP); Kazuyuki Ishihara, Nisshin (JP); Masatoshi Tsuji, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 252 days.

(21) Appl. No.: 17/877,249

(22) Filed: Jul. 29, 2022

(65) Prior Publication Data

US 2023/0058463 A1    Feb. 23, 2023

(30) Foreign Application Priority Data

Aug. 19, 2021 (JP) ................................. 2021-134290

(51) Int. Cl.
  *F21V 8/00* (2006.01)
  *G02B 17/00* (2006.01)
  *G02B 23/08* (2006.01)

(52) U.S. Cl.
  CPC ......... *G02B 6/0036* (2013.01); *G02B 6/0016* (2013.01); *G02B 6/002* (2013.01); *G02B 17/008* (2013.01); *G02B 23/08* (2013.01)

(58) Field of Classification Search
  CPC .... G02B 6/0016; G02B 6/002; G02B 6/0036; G02B 17/008; G02B 23/08
  See application file for complete search history.

(56) References Cited

U.S. PATENT DOCUMENTS

| 5,719,649 A * | 2/1998 | Shono .................. G02B 6/0036 |
| | | 362/617 |
| 6,919,976 B2 * | 7/2005 | Kasai ................. G02B 27/0081 |
| | | 359/13 |

(Continued)

FOREIGN PATENT DOCUMENTS

| JP | 2015143087 A | 8/2015 |
| JP | 6172511 B2 | 8/2017 |

(Continued)

OTHER PUBLICATIONS

U.S. Appl. No. 18/190,237, filed Mar. 27, 2023, Ando et al.
U.S. Appl. No. 17/962,573, filed Oct. 10, 2022, Ishihara et al.

*Primary Examiner* — Ryan A Lepisto
(74) *Attorney, Agent, or Firm* — Posz Law Group, PLC

(57) ABSTRACT

An optical member includes a light guide body. The light guide body has an incident surface on which an outside light is incident, a first surface having flat portions and prism portions, an incident light incident on the incident surface reaching the first surface for the first time, and a second surface arranged opposite to the flat portions. The flat portions totally reflect the incident light toward the second surface. The second surface totally reflects a reflected light reflected by the flat portion toward the first surface. The prism portion has an ejection surface to emit the incident light to outside.

19 Claims, 20 Drawing Sheets

(56) References Cited

U.S. PATENT DOCUMENTS

| | | | |
|---|---|---|---|
| 8,087,811 B2* | 1/2012 | Pakhchyan | G02B 6/0033 |
| | | | 362/617 |
| 10,613,265 B2* | 4/2020 | Shinohara | G02B 5/003 |
| 2001/0033401 A1 | 10/2001 | Kasai et al. | |
| 2004/0233488 A1 | 11/2004 | Kasai et al. | |
| 2010/0277803 A1 | 11/2010 | Pockett et al. | |
| 2023/0118387 A1 | 4/2023 | Tsuji et al. | |

FOREIGN PATENT DOCUMENTS

| | | |
|---|---|---|
| JP | 6372305 B2 | 8/2018 |
| JP | 2018132603 A | 8/2018 |

\* cited by examiner

OPTICAL MEMBER

CROSS REFERENCE TO RELATED APPLICATION

This application is based on Japanese Patent Application No. 2021-134290 filed on Aug. 19, 2021, the disclosure of which is incorporated herein by reference.

TECHNICAL FIELD

The present disclosure relates to an optical member.

BACKGROUND

An optical member has a light guide and a semi-transmissive mirror. The light guide has an incident surface on which outside light is incident, a first surface to which the outside light heads for the first time after incident from the incident surface, and a second surface opposite to the first surface. The semi-transmissive mirror is arranged adjacent to the first surface.

SUMMARY

According to an aspect of the present disclosure, an optical member that internally reflects an outside light includes a light guide body. The light guide body has an incident surface on which the outside light is incident, a first surface, to which an incident light incident from the incident surface reaches for the first time, having flat portions and prism portions, and a second surface arranged opposite to the flat portions. The flat portions totally reflect the incident light toward the second surface. The second surface totally reflects a reflected light reflected by the flat portion toward the first surface. The prism portion has an ejection surface to emit a part of the incident light or a part of light reflected by the second surface to outside.

DETAILED DESCRIPTION

Figure 1:
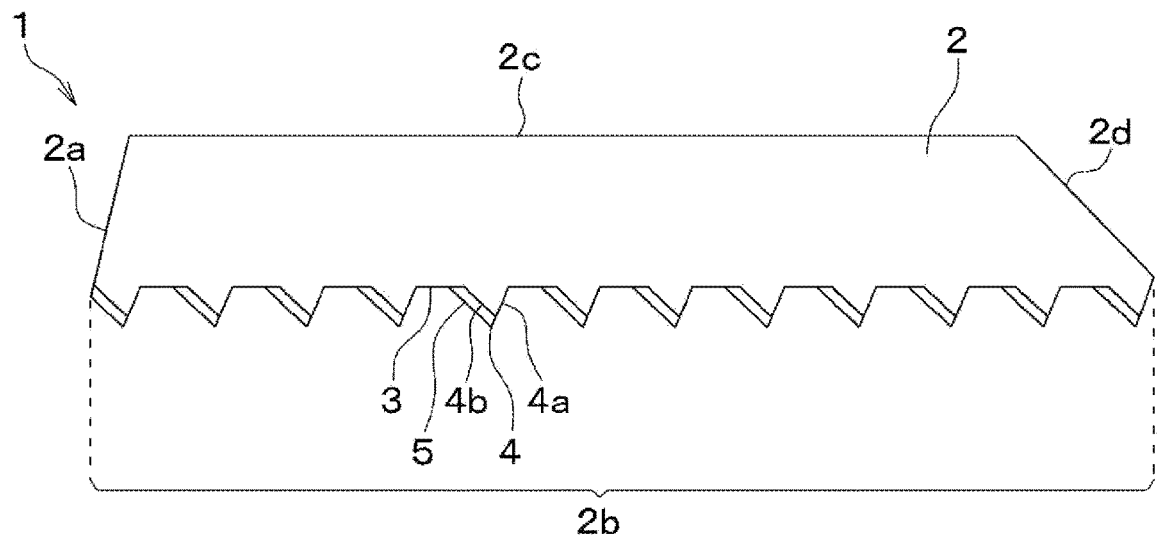
FIG. 1 is a cross-sectional view showing an optical member according to a first embodiment.

To begin with, examples of relevant techniques will be described.

An optical member has a light guide and a semi-transmissive mirror. The light guide has an incident surface on which outside light is incident, a first surface to which the outside light heads for the first time after incident from the incident surface, and a second surface opposite to the first surface. The semi-transmissive mirror is arranged adjacent to the first surface. In this optical member, a part of the outside light incident from the incident surface is reflected by the semi-transmissive mirror to the second surface, and the rest is absorbed or transmitted by the semi-transmissive mirror. The optical member has a prism sheet having prisms arranged on the first surface, and the light transmitted through the semi-transmissive mirror is emitted to the outside through the prisms.

As a result, the outside light incident from the incident surface is ejected over a wide range through the prisms on the first surface different from the incident surface. Thus, the user located adjacent to the first surface can visually recognize the scene behind the incident surface. This optical member is used, for example, as a blind spot assisting device that is arranged on a predetermined obstacle and allows the user to visually recognize a scene of a blind spot region that is blocked by the obstacle and cannot be directly seen by the user.

The semi-transmissive mirror is composed of, for example, a single-layer metal vapor-deposited film obtained by depositing a metal material or a dielectric multilayer coat film obtained by coating a dielectric material in multiple layers.

However, when the semi-transmissive mirror is composed of a single-layer metal vapor-deposited film, the light absorption rate in the metal vapor-deposited film is large, and the loss in multiple light reflections in the semi-transmissive mirror becomes large. In this case, the scene visually recognized through the optical member becomes dark for the user.

When the semi-transmissive mirror is composed of a dielectric multilayer coat film, the dielectric multilayer coat film has a light absorption rate smaller than the single-layer metal vapor-deposited film, so that the light loss in the semi-transmissive mirror can be suppressed.

However, in the dielectric multilayer coated film, the reflectance of the semi-transmissive mirror changes depending on the incidence angle and the wavelength of light on the semi-transmissive mirror. The number of manufacturing steps is larger when using the dielectric multilayer coated film, than when using the metal vapor-deposited film. Therefore, when using the dielectric multilayer coated film, the brightness and color tone of the scene visually recognized by the user changes depending on the angle at which the first surface is viewed by the user, and the manufacturing cost of the optical member increases.

The present disclosure provides an optical member including a light guide body having an incident surface, a first surface and a second surface, in which changes are suppressed in brightness and color tone of an external view visually recognized through the first surface, while reducing the loss of light on the first surface.

According to an aspect of the present disclosure, an optical member that internally reflects an outside light includes a light guide body. The light guide body has an incident surface on which the outside light is incident, a first surface, to which an incident light incident from the incident surface reaches for the first time, having flat portions and prism portions, and a second surface arranged opposite to the flat portions. The flat portions totally reflect the incident light toward the second surface. The second surface totally reflects a reflected light reflected by the flat portion toward the first surface. The prism portion has an ejection surface to emit a part of the incident light or a part of light reflected by the second surface to outside.

This optical member includes the light guide body having the incident surface, the first surface to which the incident light reaches for the first time from the incident surface, and the second surface opposite to the first surface. The first surface is composed of plural prism portions and plural flat portions. The flat portions totally reflect the incident light to the second surface. The second surface reflects the light reflected by the flat portions to the first surface. As a result, the optical member can guide the incident light inside the light guide body without having a semi-transmissive mirror, and there is no light absorption caused by the semi-transmissive mirror. Further, the light reflectance in the light guide body does not depend on the wavelength of the light. Therefore, the optical member has the effect of suppressing changes in the brightness and color tone of the external view seen by the user through the first surface while reducing the loss of light in the light guide body.

The reference numerals attached to the components and the like indicate an example of correspondence between the components and the like and specific components and the like in embodiments to be described below.

Hereinafter, embodiments of the present disclosure will be described with reference to the drawings. In the following embodiments, the same reference numerals are assigned to portions that are the same or equivalent to each other for description.

First Embodiment

An optical member 1 of the first embodiment will be described with reference to FIGS. 1 to 4. The optical member 1 can be used, for example, as a blind spot assisting device that is attached to a member or an obstacle that blocks the user's field of view so as to make the user visually recognize the scene of the blind spot. For example, in the case of in-vehicle use, the optical member 1 is attached to a pillar of a vehicle, and guides the outside light from a blind spot due to the pillar to the user so as to provide a view of the blind spot.

Figure 4:
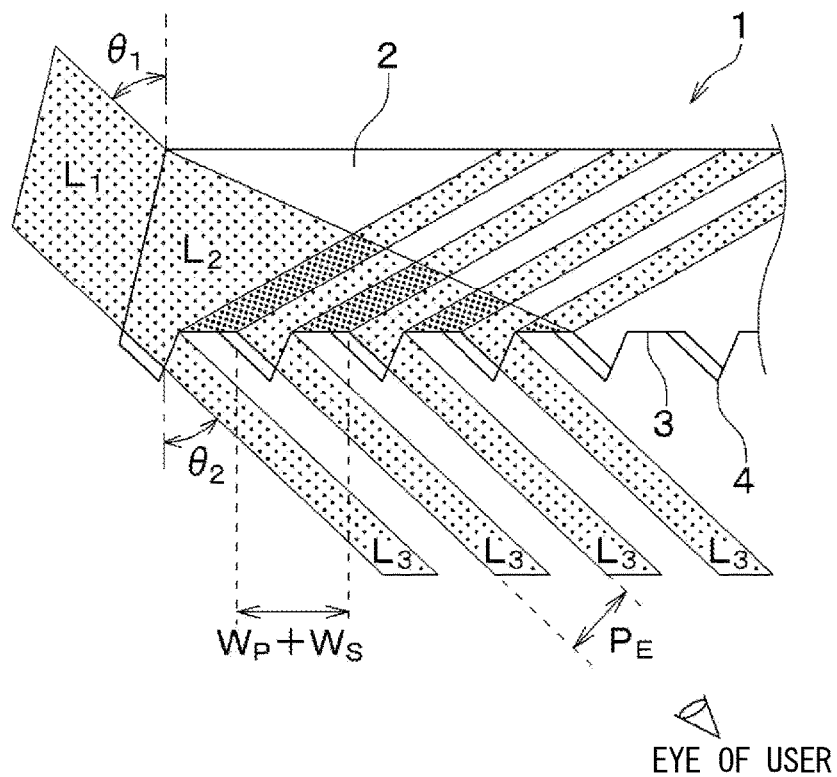
FIG. 4 is an explanatory diagram for explaining a relationship between widths of a flat portion and a prism portion on a first surface and the amount of visible light.

In FIG. 4, in order to make a light guided in the optical member 1 easy to understand, a light to be incident on the optical member 1, the incident light, and the light emitted out of the optical member 1 are hatched.

Figure 2:
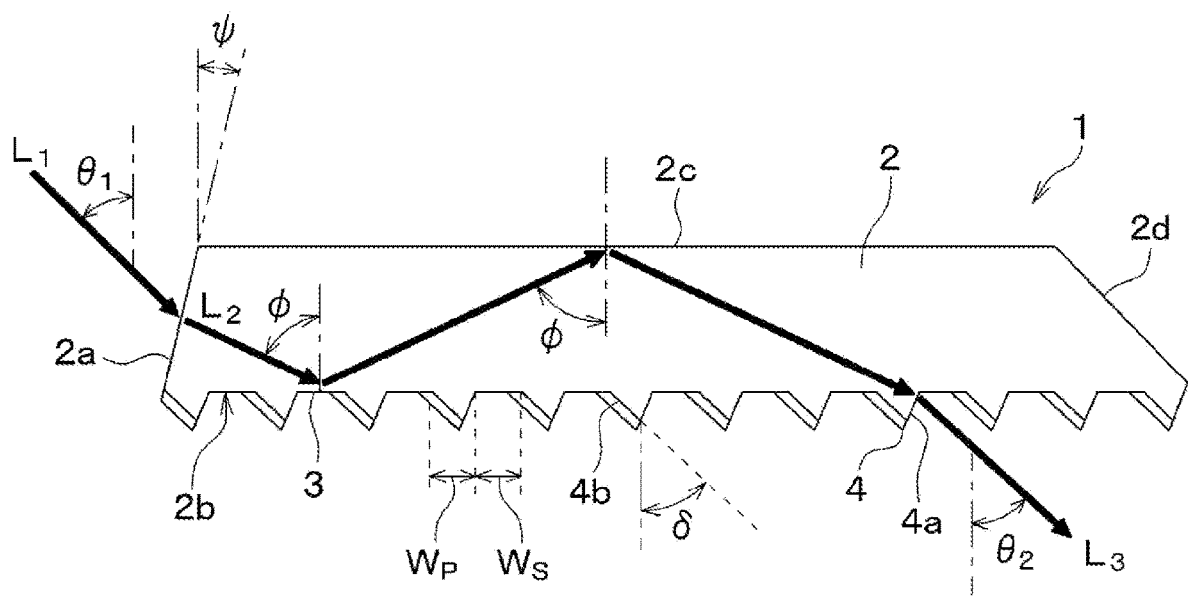
FIG. 2 is a first explanatory diagram for explaining a light guided in the optical member of the first embodiment.
Figure 3:
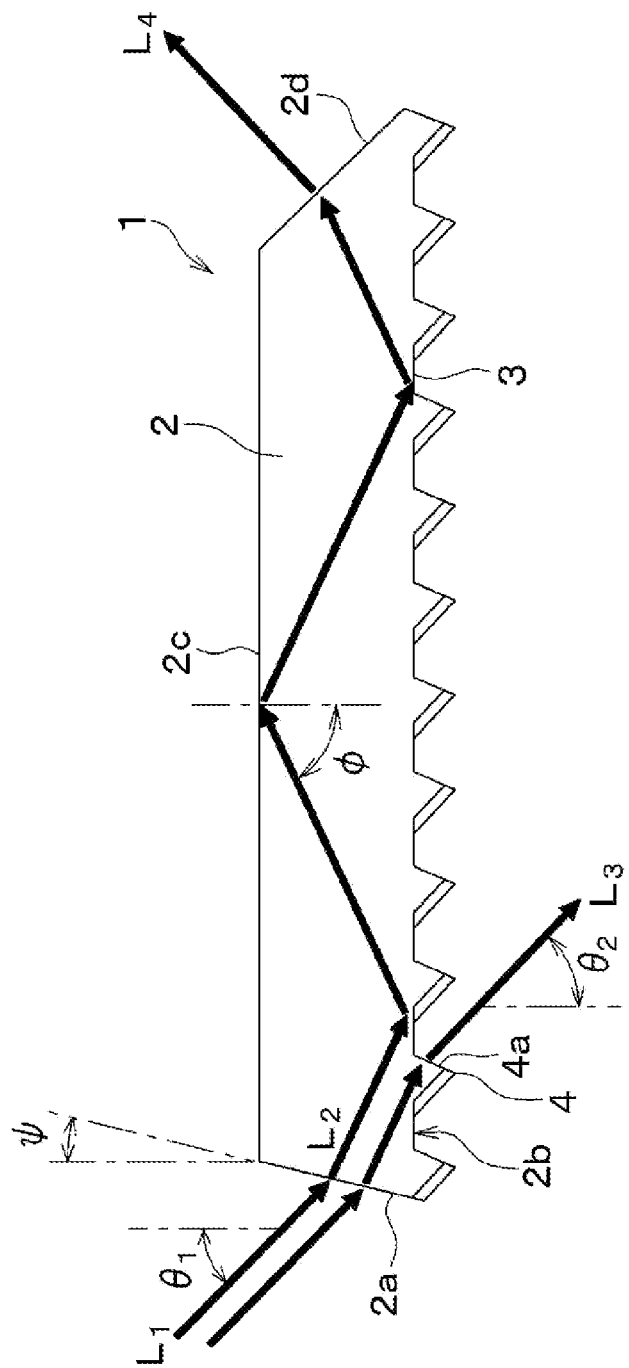
FIG. 3 is a second explanatory view for explaining a light guided in the optical member of the first embodiment.

As shown in FIG. 1, the optical member 1 includes a transparent light guide body 2 having an incident surface $2a$, a first surface $2b$ different from the incident surface $2a$, and a second surface $2c$ opposite to the first surface $2b$. The first surface $2b$ has flat portions 3 and prism portions 4, and may be composed of the flat portions 3 and the prism portions 4. The light guide body 2 further has a third surface $2d$ connecting the first surface $2b$ and the second surface $2c$. In the optical member 1, as shown in FIGS. 2 and 3, an outside light $L_1$ is guided from the incident surface $2a$ inside the light guide body 2 and emitted from the first surface $2b$ different from the incident surface $2a$.

Hereinafter, for convenience of explanation, the light incident into the light guide body 2 from the incident surface $2a$ is referred to as "incident light $L_2$", and the light emitted out of the prism portion 4 on the first surface $2b$ is referred to as "emission light $L_3$". Further, the light that escapes out of the third surface $2d$ is referred to as "afterglow $L_4$".

The light guide body 2 is made of, for example, a transparent material such as glass or a resin material such as polyethylene terephthalate, polycarbonate, polyethylene, or acrylic. The light guide body 2 is designed so that the incident light $L_2$ is totally reflected by the flat portion 3 and the second surface $2c$ and is guided internally. Specifically, the light guide body 2 is designed such that Formula (1) is satisfied, in which the constituent material has a refractive index $n_1$, an external medium of the light guide body 2 has a refractive index $n_2$ (for example, in the case of an air layer, $n_2=1$), and the incident light $L_2$ has an incidence angle $\phi$ relative to the flat portion 3 and the second surface $2c$.

$$\sin \phi \geq n_2/n_1 \qquad \text{Formula (1):}$$

As a result, even if the light guide body 2 does not have a semi-transmissive mirror, a part of the incident light $L_2$ from the incident surface $2a$ is totally reflected by the flat portion 3 and the second surface $2c$, and is ejected to the outside.

Specifically, for example, as shown in FIG. 2, the outside light $L_1$ is incident on the incident surface $2a$ of the optical member 1 at an incident angle $\theta_1$ and is refracted in the light guide body 2 to become the incident light $L_2$ to reach the first surface $2b$ for the first time. A part of the incident light $L_2$ that reaches the flat portion 3 at the guide angle $\phi$ is totally reflected at the interface with the outside and is directed toward the second surface $2c$ without being emitted to the outside. The incident light $L_2$ that has reached the second surface 2c at the guide angle ϕ is totally reflected again at the interface with the outside and heads toward the first surface 2b. A part of the light is refracted at the ejection surface 4a of the prism portion 4 and is ejected to the outside at an emission angle $\theta_2$, and the remaining part is totally reflected by the flat portion 3. Further, as shown in FIG. 3, for example, a part of the incident light $L_2$ from the incident surface 2a for the first time reaches the emission surface 4a of the prism portion 4 and is refracted and emitted to the outside at an emission angle $\theta_2$. A part of the incident light $L_2$ that is repeatedly reflected by the flat portion 3 and the second surface 2c and does not reach the prism portion 4 finally reaches the third surface 2d, and the afterglow $L_4$ is refracted and ejected to the outside. As described above, the optical member 1 is configured such that the ejection from the first surface 2b and the total internal reflection are repeated in the light guide body 2. Thus, the view area on the first surface 2b, that is, the area where the user can visually recognize the emission light $L_3$ can be increased.

The "incident angle $\theta_1$" refers to an angle defined between the incident direction of the outside light $L_1$ to the incident surface 2a and the normal direction with respect to the flat surface of the flat portions 3 of the first surface 2b (hereinafter referred to as "normal direction"). The "guide angle ϕ" is formed between the traveling direction of the incident light $L_2$ on the flat portion 3 and the normal direction. Alternatively, the "guide angle ϕ" is formed between the traveling direction of the incident light $L_2$ on the second surface 2c and a normal direction with respect to the second surface 2c. When the flat portion 3 and the second surface 2c are parallel, the guide angle ϕ in the flat portion 3 and the second surface 2c has the same value regardless of the number of reflections. The "emission angle θ2" refers to an angle formed between the traveling direction of the emission light $L_3$ and the normal direction with respect to the flat surface of the flat portions 3, and is the same value as $\theta_1$ when the incident surface 2a and the emitting surface 4a are parallel to each other. The guide angle ϕ is based on, for example, a light guide angle at the maximum incident angle of the outside light $L_1$ incident on the light guide body 2. As shown in FIG. 4, the maximum incident angle of the outside light $L_1$ refers to an angle formed between the normal direction and a virtual straight line connecting the eye of the user located adjacent to the first surface 2b and the end point of the incident surface 2a adjacent to the first surface 2b. The above reference is made because the outside light $L_1$ exceeding the maximum incident angle includes light rays from a region that can be directly viewed by the user without passing through the light guide body 2.

The outside light $L_1$ is incident on the incident surface 2a of the light guide body 2. In the present embodiment, the incident surface 2a intersects with the first surface 2b. The incident surface 2a is inclined at an inclination angle ψ with respect to the normal direction. That is, in the present embodiment, the incident surface 2a is in an inclined state so that the angle formed with the flat surface becomes an acute angle. As shown in FIG. 2, the inclination angle ψ of the incident surface 2a with respect to the normal direction of the flat portion is smaller than the guide angle ϕ of the incident light $L_2$ with respect to the flat portion 3 and the second surface 2c. At this time, if ψ<π/2−ϕ is satisfied due to the refraction condition, the incident light $L_2$ is refracted in a direction in which ϕ becomes larger than the incident angle $\theta_1$ of the outside light $L_1$, and is guided to a wider range than the first surface 2b. Further, the light guide body 2 is configured to satisfy ϕ>ψ, since ϕ is a total reflection angle, and the refractive index of a normal transparent resin material is 1.4 or more, and ϕ>45.3 due to n·sinϕ>1.

The incident light $L_2$ from the incident surface 2a for the first time reaches the first surface 2b of the light guide body 2 that has the flat portions 3 and the prism portions 4. In the present embodiment, the first surface 2b intersects the incident surface 2a at the prism portion 4, and the flat portions 3 and the prism portions 4 are alternately and repeatedly arranged toward the third surface 2d. The first surface 2b having the flat portion 3 and the prism portion 4 is formed by a known plastic molding method using, for example, a mold.

The second surface 2c is a smooth surface substantially parallel to the first surface 2b. The second surface 2c functions as a reflecting surface that totally reflects the incident light $L_2$ reflected by the flat portions 3 toward the first surface 2b. That is, the second surface 2c is a second reflecting surface paired with the first reflecting surface formed by the flat portions 3 described below.

The third surface 2d connects the first surface 2b and the second surface 2c, and is, for example, a tilt surface inclined at a predetermined angle. A part of the incident light $L_2$ that is repeatedly reflected by the flat portion 3 and the second surface 2c and does not reach the prism portion 4 will escape from the third surface 2d to the outside as the afterglow $L_4$. It is possible to prevent the emission of the afterglow $L_4$ by performing a light-shielding treatment such as arranging a light absorption film (not shown) on the third surface 2d. Thereby, the generation of noise such as ghost due to the leakage of the afterglow $L_4$ can be suppressed.

As shown in FIGS. 2 and 3, the flat portions 3 function as a reflecting surface that reflect the incident light $L_2$ that has reached the flat portion 3 toward the second surface 2c by total internal reflection. As a result, the light guide body 2 can guide the incident light $L_2$ internally without having a semi-transmissive mirror made of a metal material or a dielectric material. Further, the loss due to absorption of the incident light $L_2$ in the flat portion 3 is not generated. The flat portion 3 has the light guide direction along the flat surface from the incident surface 2a to the third surface 2d, and has the width Ws in the light guide direction such that the reflection rate of the incident light $L_2$ on the first surface 2b becomes equal to or higher than a predetermined value. Specifically, the flat portions 3 of the first surface 2b are a reflecting portion for the incident light $L_2$, and the prism portions 4 are an absorbing portion and an emitting portion for the incident light $L_2$. Therefore, the reflectance Rw of the first surface 2b is determined by the ratio of the flat portions 3. The reflectance Rw of the first surface 2b is expressed by Formula (2), where the width of the prism portion 4 adjacent to the flat portion 3 having the width Ws in the light guide direction is defined as Wp.

$$Rw=Ws/(Wp+Ws) \qquad \text{Formula (2):}$$

It is preferable that the flat portions 3 satisfy Rw>0.5, i.e., Wp/Ws≤1. That is, the flat portion 3 has the width Ws such that the reflection of the incident light $L_2$ on the first surface 2b is equal to or greater than the emission of the incident light $L_2$ on the first surface 2b. In this case, the light guide body 2 guides more than half of the incident light $L_2$ on the first surface 2b and emits the emission light $L_3$ in a range wider than the first surface 2b, so that the brightness of the emission light $L_3$ can be secured.

Further, when the light guide body 2 satisfies Formula (1) and the guide angle ϕ is the total reflection angle, the reflectance Rw on the first surface 2b is determined only by the ratio of the widths of the flat portion 3 and the prism portion 4, as shown in Formula (2). That is, in the optical member 1, the reflectance Rw of the light guide body 2 does not depend on the angle or wavelength of the incident light $L_2$. Therefore, variation in the color tone and brightness of the emission light $L_3$ is suppressed compared with a conventional optical member using a semi-transmissive mirror.

The prism portion 4 is arranged adjacent to the flat portion 3 and has an ejection surface 4a protruding outward from the flat portion 3 to emit a part of the incident light $L_2$ to the outside. As shown in FIG. 1, the prism portion 4 has a protruding shape having the ejection surface 4a and a facing surface 4b facing the ejection surface 4a and intersecting the ejection surface 4a. The prism portions 4 are similar to each other.

The ejection surface 4a of the prism portion 4 is substantially parallel to the incident surface 2a. When the emission surface 4a is parallel to the incident surface 2a, the emission angle $\theta_2$ of the emission light $L_3$ from the emission surface 4a is the same as the incident angle $\theta_1$, so that the user located adjacent to the first surface 2b can visually recognize the same light rays as the outside light $L_1$ due to the optical member 1. The case where the incident surface 2a and the ejection surface 4a are parallel to each other includes a case where the incident surface 2a and the ejection surface 4a are substantially parallel due to an unavoidable error in, for example, the processing accuracy of the light guide body 2. The same applies to the following "substantially parallel" in the present specification.

As shown in FIG. 2, the facing surface 4b of the prism portion 4 is inclined with respect to the normal direction at an inclination angle δ, and intersects the ejection surface 4a. The facing surface 4b is covered with a light absorption film 5, and reflection of the incident light $L_2$ on the facing surface 4b and intrusion of external light from the first surface 2b are suppressed. As a result, generation of noise such as ghosts is suppressed, which is caused by an overlap between the emission light $L_3$ and external light from the first surface 2b. Further, noise can be suppressed, which is caused by unintended reflected light of the incident light $L_2$ on the facing surface 4b being emitted from the emission surface 4a. The light absorption film 5 is made of an arbitrary light-shielding resin material, metal material, or the like, and is formed by an arbitrary process such as printing or vapor deposition.

The inclination angle δ of the facing surface 4b is larger than or equal to the emission angle $\theta_2$ of the emission light $L_3$. When the incident surface 2a and the emission surface 4a are parallel, the inclination angle δ is larger than or equal to the incident angle $\theta_1$ of the outside light $L_1$. As a result, the emission light $L_3$ is emitted to the outside without being blocked by the facing surface 4b. Further, it is preferable that the inclination angle δ of the facing surface 4b is smaller than the guide angle ϕ in the flat portion 3. As a result, it is possible to suppress the incident light $L_2$ from entering the facing surface 4b and interfering with it, and it is possible to suppress unintended reflection of the incident light $L_2$ on the facing surface 4b and noise caused by the reflection.

When the width Ws of the flat portions 3 and the width Wp of the prism portions 4 are all the same, a gap corresponding to the prism width Wp is formed between the reflected light rays. If the relationship between the gap and the prism portion 4 in the rear portion has a periodic change, uneven brightness, that is, moire, may be generated. From the viewpoint of suppressing such moire, it is preferable that Ws and Wp have, for example, values within a predetermined range centered on a certain value, that is, have a distribution. For example, the width Ws of the flat portions 3 in the light guide direction is preferably to be within a predetermined range expressed by the following formula, in which the number of flat portions 3 on the first surface 2b is k1 and the average value Wsa is a center value.

$$W_{Sa} = \left(\sum_{i=1}^{k1} W_{Si}\right)/k1$$

The width Wp of the prism portion 4 in the light guide direction is preferably to be within a predetermined range expressed by the following formula, in which the number of prism portions 4 on the first surface 2b is k2 and the average value Wpa as a center value.

$$W_{Pa} = \left(\sum_{i=1}^{k2} W_{Pi}\right)/k2$$

The predetermined range for Ws and Wp is, for example, ±10% of the center value. Since the values of Ws and Wp are distributed in this way, it is possible to avoid the periodic relationship between the gap between the reflected rays in the flat portion 3 and the subsequent prism portion 4, and suppress the occurrence of moire. Further, Ws and Wp may be within a predetermined range from the center value as described above, and the numerical values may be changed as appropriate. Further, k1 and k2 are, for example, natural numbers of 2 or more.

Since the emission light $L_3$ is emitted from only the emission surface 4a of the prism portion 4 at the emission angle $\theta_2$ on the first surface 2b, the emission light $L_3$ reaching the user has, as shown in FIG. 4, a bright and darkness pattern having a period which is the sum of the width Wp of the prism portion 4 and the width Ws of the flat portion 3. The pitch $P_E$ of the emission light $L_3$ in the view direction of the user is represented by Formula (3).

$$P_E=(Wp+Ws)\cos\theta_2 \qquad \text{Formula (3):}$$

It is preferable that the widths Ws and Wp of the flat portion 3 and the prism portion 4 adjacent to each other are designed so that the pitch $P_E$ of the emission light $L_3$ is less than 2 mm. This is because the minimum pupil diameter of a person in a bright place is 2 mm or more. When the pitch $P_E$ of the emission light $L_3$ is less than 2 mm, the amount of the emission light $L_3$ visually recognized by the user is averaged and the change in bright/darkness is suppressed when the user's viewpoint moves.

The flat portions 3 and the second surface 2c do not necessarily have to be completely parallel, depending on the distance of the blind spot region desired to be visually recognized by the user.

Specifically, when the flat portions 3 and the second surface 2c are parallel, the guide angle ϕ of the incident light $L_2$ is constant regardless of the position in the light guide body 2, so that the emission angle $\theta_2$ of the emission light $L_3$ is constant. Since the emission light $L_3$ having the same emission angle $\theta_2$ enters the user's eye even if the position of the user's viewpoint is different, it is the same as a light ray from infinity enters the human eye. That is, it is preferable that the flat portions 3 and the second surface 2c are parallel to each other when the blind spot region to be visually recognized by the user is located at a predetermined distance or more (for example, several tens of meters to several hundreds of meters) from the user.

When one of the flat portions 3 and the second surface 2c is slightly tilted with respect to the other, the guide angle ϕ of the incident light $L_2$ changes depending on the position in the light guide body 2. In this state, since the emission angle $\theta_2$ of the emission light $L_3$ changes according to the viewpoint position of the user, it is the same state as when a light ray from a finite distance below a predetermined distance such as several meters to several tens of meters enters the human eye. That is, when the blind spot region to be visually recognized by the user is located at a finite distance less than or equal to a predetermined distance from the user, it is preferable that the flat portions 3 and the second surface 2c are not parallel. In this case, the distance between the flat portions 3 and the second surface 2c facing each other is increased as separating from the incident surface 2a. If the flat portions 3 and the second surface 2c are arranged to approach each other, the emission light $L_3$ is emitted in the direction away from each other, and binocular fusion cannot be performed.

According to the present embodiment, the first surface 2b to which the incident light $L_2$ from the incident surface 2a reaches for the first time has the flat portions 3 and the prism portions 4. Therefore, the optical member 1 is capable of guiding the incident light $L_2$ without a semi-transmissive mirror. As a result, the manufacturing process can be simplified and the manufacturing cost can be reduced as compared with the conventional optical member having a semi-transmissive mirror. Further, since the light guide body 2 is configured so that the incident light $L_2$ is totally reflected by the flat portion 3 and the second surface 2c facing the flat portion 3, the light absorption loss in the light guide body 2 is suppressed. Further, since the reflectance Rw of the incident light $L_2$ on the first surface 2b is determined by the ratio between the width Ws of the flat portion 3 and the width Wp of the prism portion 4 adjacent to each other, the reflectance Rw does not depend on the wavelength and angle of the incident light $L_2$. Therefore, the optical member 1 of the present embodiment can suppress changes in the brightness and color tone of the external view that the user visually recognizes through the first surface 2b while suppressing the loss of light in the light guide body 2.

Modification to First Embodiment

Figure 5:
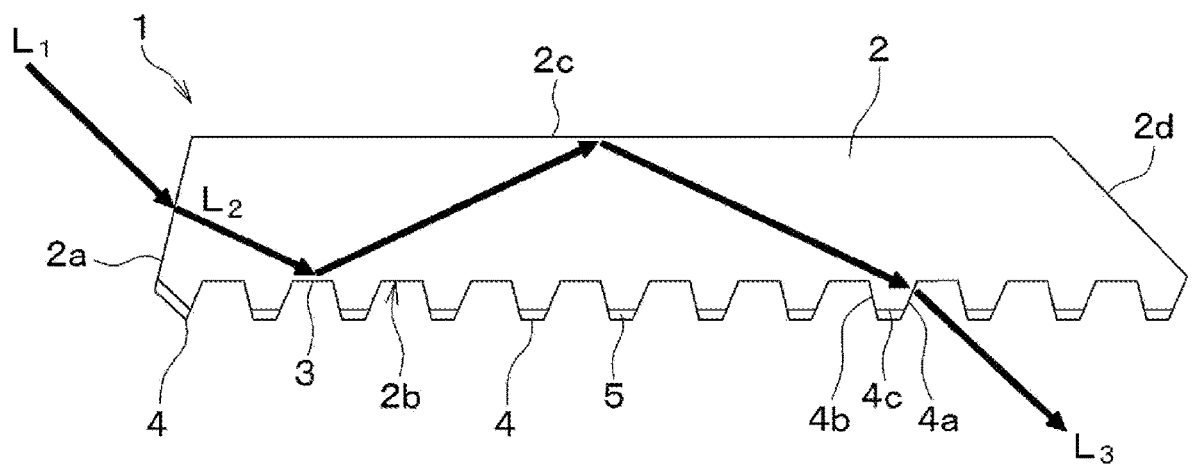
FIG. 5 is a cross-sectional view showing a modification of the optical member of the first embodiment.

As shown in FIG. 5, in the optical member 1, a part of the prism portions 4 may have a top side 4c connecting the ejection surface 4a and the facing surface 4b. In this case, the light absorption film 5 is arranged to cover the top side 4c instead of the facing surface 4b.

In this modification, the prism portion 4 has a trapezoidal shape having the ejection surface 4a, the facing surface 4b, and the top side 4c, except for the prism portion 4 closest to the incident surface 2a. The prism portions 4 are aligned at the same height from the flat portion 3 to the top side 4c in the normal direction. The prism portions 4 have the top side 4c at the same height as the apex of the prism portion 4 closest to the incident surface 2a (the intersection between the ejection surface 4a and the facing surface 4b). In the prism portions 4, the top side 4c is parallel to the second surface 2c.

In the prism portions 4, even when the incident light $L_2$ is incident on the facing surface 4b and reflected on the facing surface 4b, the reflected light is directed toward the top side 4c and is shielded by the light absorption film 5.

Figure 6:
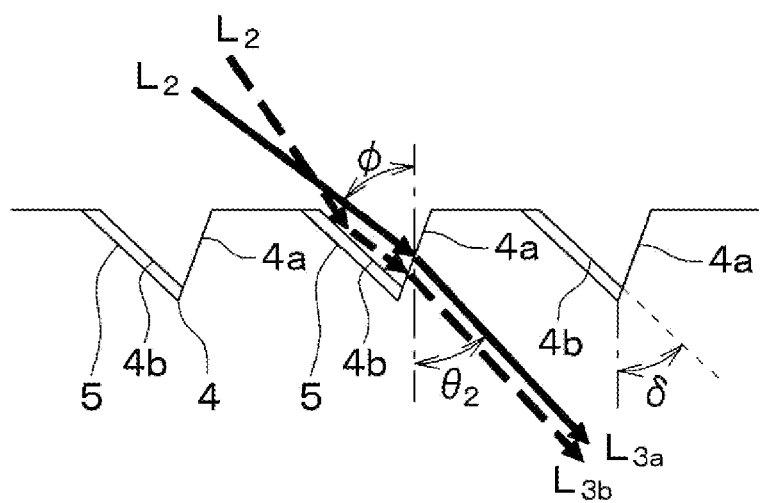
FIG. 6 is an explanatory diagram for explaining noise generation in a prism portion in which an ejection surface and a facing surface are adjacent to each other.

Specifically, as shown in FIG. 6, in case where the ejection surface 4a and the facing surface 4b intersect adjacent to each other, if the incident light $L_2$ is incident on the facing surface 4b, the incident light $L_2$ is reflected by the facing surface 4b, and the reflected light can be emitted from the emission surface 4a. When the incident light $L_2$ directly reaches the emission surface 4a, the light is emitted as the emission light $L_{3a}$. If the emission light $L_{3a}$ overlaps with the emission light $L_{3b}$, which is the reflected light on the facing surface 4b and emitted from the emission surface 4a, noise will occur. Even if the facing surface 4b is tilted at an inclination angle $\delta$ (<guide angle $\phi$), the difference between the guide angle $\phi$ and the inclination angle $\delta$ is generally about 10°, and it is difficult to provide an angle difference larger than 10°. Further, if the incident light $L_2$ having an incident angle close to 90° is incident on the facing surface 4b, it is difficult to completely suppress the interfacial reflection and to shield the reflected light with the light absorption film 5. In this case, the reflected light escapes from the ejection surface 4a to the outside. As a result, in case where the ejection surface 4a and the facing surface 4b intersect adjacently with each other, it may not be able to suppress the generation of noise caused by the facing surface 4b.

In contrast, when the prism portions 4 have the trapezoidal shape, since the top side 4c exists between the ejection surface 4a and the facing surface 4b, the inclination angle of the facing surface 4b is greatly deviated from the guide angle $\phi$. As a result, even when the incident light $L_2$ is incident and reflected on the facing surface 4b, the reflected light is directed toward the top side 4c and does not reach the emission surface 4a, so that noise caused by the emission light $L_{3b}$ can be prevented.

Figure 7:
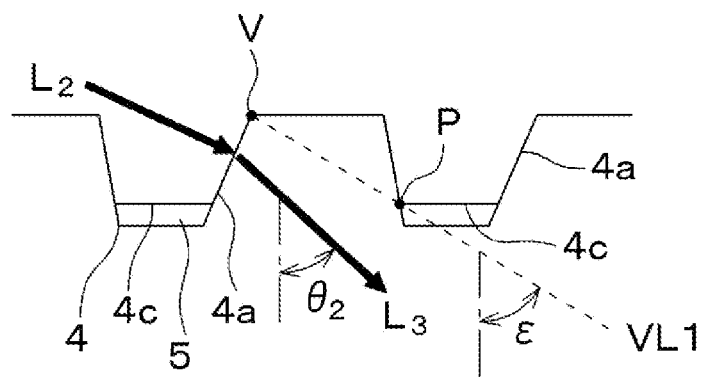
FIG. 7 is an enlarged cross-sectional view showing a prism portion in the optical member of FIG. 5.

As shown in FIG. 7, in the prism portion 4, the angle $\varepsilon$ formed between the normal direction and a virtual straight line VL1 connecting the point V and the point P is larger than the emission angle $\theta_2$ of the emission light $L_3$. The point V is a first end point of the ejection surface 4a of a certain prism portion 4 adjacent to the flat portion 3, and the point P is a second end point of the top side 4c of another prism portion 4 adjacent to the certain prism portion 4 adjacent to the facing surface 4b. As a result, the emission light $L_3$ from a certain prism portion 4 is emitted to the outside without being hindered by the facing surface 4b of the adjacent prism portion 4, so that the loss of the emission light $L_3$ from the ejection surface 4a can be suppressed.

This modification also provides the optical member 1 having the same effect as that of the first embodiment. Further, since the prism portions 4 have trapezoidal shape having the top side 4c, it is possible to obtain an effect of preventing noise generation due to reflection of the incident light $L_2$ on the facing surface 4b of the prism portions 4.

Second Embodiment

The optical member 1 of the second embodiment will be described with reference to FIGS. 8 and 9. In FIG. 9, in order to make the light guided in the optical member 1 easy to understand, a part of the outside light $L_1$, the incident lights $L_{21}$ to $L_{23}$ and the emission lights $L_{31}$ to $L_{33}$ are shown, and the light rays are hatched.

Figure 8:
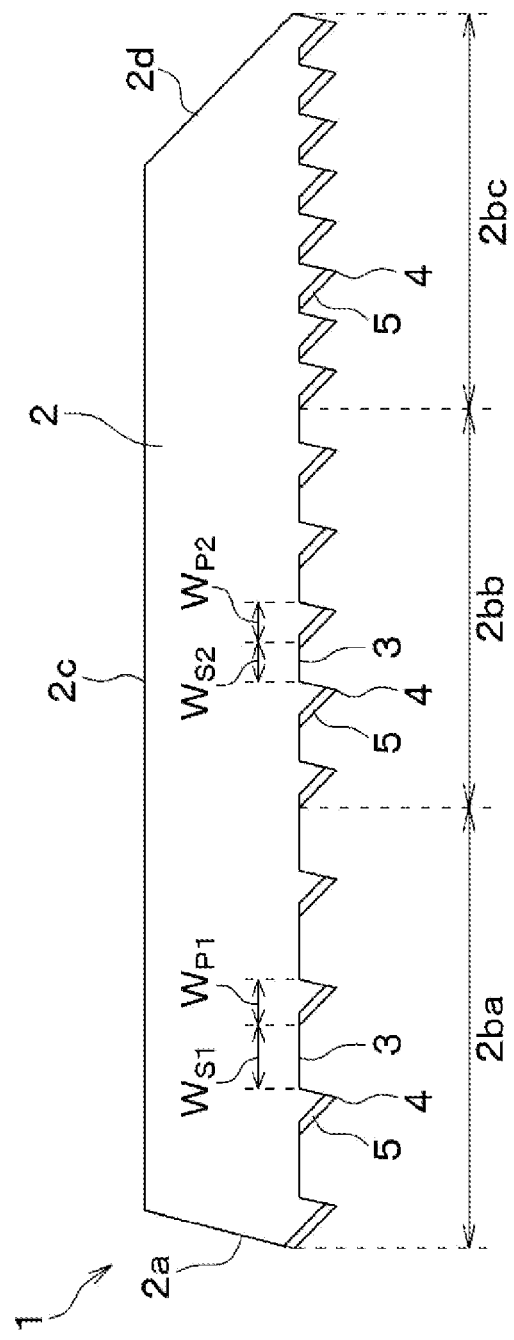
FIG. 8 is a cross-sectional view showing an optical member according to a second embodiment.
Figure 9:
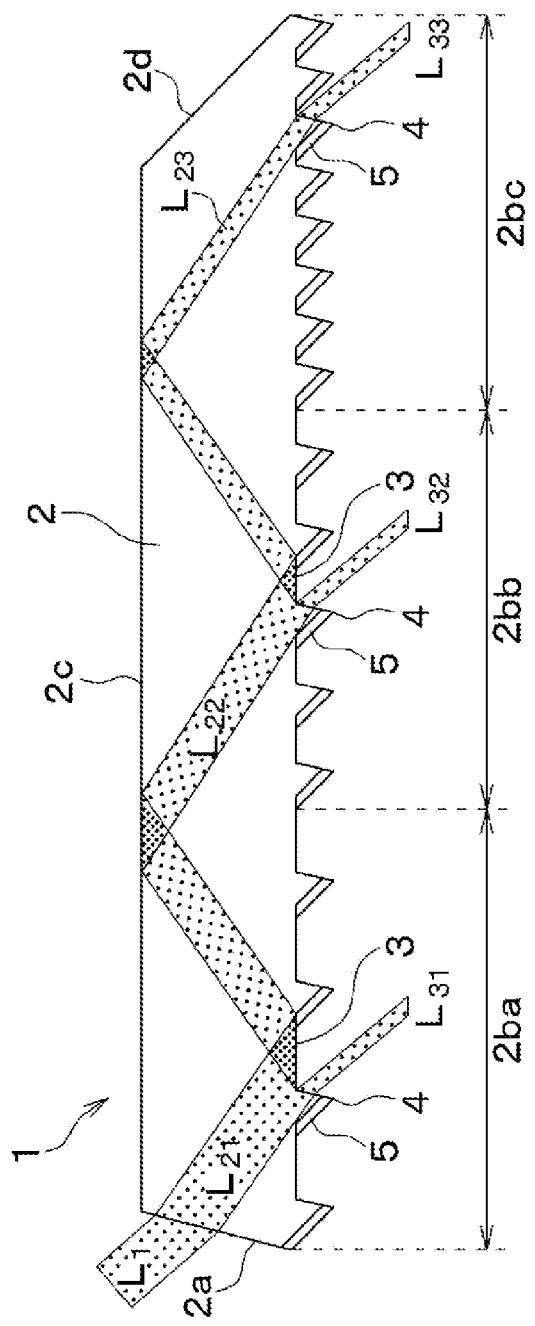
FIG. 9 is an explanatory diagram for explaining a light guided in the optical member of the second embodiment.

In the optical member 1 of the present embodiment, as shown in FIG. 8, the first surface 2b has three regions 2ba, 2bb, and 2bc, and the ratio of the widths of the flat portion 3 and the prism portions 4 adjacent to each other is different among the regions 2ba, 2bb, and 2bc. This point different from the first embodiment will be mainly described in the present embodiment.

In the present embodiment, the first surface 2b is divided into, for example, a first region 2ba, a second region 2bb, and a third region 2bc in order from the incident surface 2a, and the ratio of the widths of the flat portion 3 and the prism portion 4 adjacent to each other is different among the regions 2ba, 2bb, and 2bc. Specifically, in the first region 2ba, the width of the flat portion 3 is $W_{S1}$ and the width of the prism portion 4 is $W_{P1}$. In the second region 2bb, the width of the flat portion 3 is $W_{S2}$ and the width of the prism portion 4 is $W_{P2}$. The value $W_{S1}/W_{P1}$ is larger than $W_{S2}/W_{P2}$. The third region 2bc is composed of only the prism portions 4, and the width of the flat portion 3 with respect to the width of the prism portion 4 is zero. The ratio of the width of the flat portion 3 to the width of the prism portion 4, that is, Ws/Wp is smaller in a region farther from the incident surface 2a, in the first surface 2b.

In other words, the width of the flat portions 3 is larger in the region closer to the incident surface 2a, and the width is zero in the region farthest from the incident surface 2a, that is, no flat portions are arranged. The prism portions 4 have similar shapes, and may have the same width and height in each region, or may have different widths and heights in each region. Further, in the regions 2ba to 2bc, each of the width Ws of the flat portion 3 and the width Wp of the prism portion 4 is within a predetermined range centered on a constant value (for example, average value represented by Formula 1 or Formula 2), as in the first embodiment. As a result, it is possible to suppress the occurrence of moire due to the periodic structure of the flat portion 3 and the prism portion 4. Further, since the structural cycle is different among the regions, it is possible to suppress the occurrence of moire even when the widths Ws of the flat portion 3 and the width Wp of the prism portion 4 in each region are constant value.

Here, the effect obtained by the first surface 2b composed of the plural regions having different Ws/Wp values will be described. For example, as shown in FIG. 9, the outside light $L_1$ is incident on the light guide body 2 and is reflected twice by the flat portion 3 as a typical example.

For convenience of explanation, a part of the incident light $L_2$ from the incident surface 2a until reaching the flat portion 3 for the first time is referred to as "incident light $L_{21}$." A part of the incident light $L_{21}$ reflected by the flat portion 3 is referred to as "incident light $L_{22}$." A part of the incident light $L_{22}$ reflected by the flat portion 3 is referred to as "incident light $L_{23}$." A part of the incident light $L_{21}$ emitted from the prism portion 4 is referred to as "emission light $L_{31}$." A part of the incident light $L_{22}$ emitted from the prism portion 4 is referred to as "emission light $L_{32}$." A part of the incident light $L_{23}$ emitted from the prism portion 4 is referred to as "emission light $L_{33}$".

As in the first embodiment, when the ratio of the widths of the flat portions 3 and the prism portions 4 adjacent to each other is the same in the entire region of the first surface 2b, the reflectance Rw is constant, so that the amount of incident light $L_2$ decreases at a constant rate as the number of reflection times increases. For example, when the reflectance Rw is equal to 0.6 and the incident light $L_{21}$ is defined as 100%, the amount of incident light $L_{22}$ is 100×0.6=60% and the amount of emission light $L_{31}$ is 100−60=40%. Further, the amount of incident light $L_{23}$ is 60×0.6=36%, and the amount of the emission light $L_{32}$ is 60−36=24%. The amount of the reflected portion of the incident light $L_{23}$ is 36×0.6=21.6%, and the amount of emission light $L_{33}$ is 36−21.6=14.4%. When the value Ws/Wp is constant as described above, the amount of emission light $L_3$ decreases as the number of reflections increases, so that the position farther from the incident surface 2a of the first surface 2b looks darker.

In contrast, according to the present embodiment, the first surface 2b is composed of the plural regions having different Ws/Wp values, and the reflectance Rw is different among the regions. For example, the first surface 2b is configured so that the reflectance Rw of the first region 2ba is 2/3, the reflectance Rw of the second region 2bb is 1/2, and the reflectance Rw of the third region 2bc is 0. In this case, when the incident light $L_{21}$ is defined as 100%, the incident light $L_{22}$ is 100×2/3≈67%, and the emission light $L_{31}$ is 100−67≈33%. Further, the incident light $L_{23}$ is 67×1/2≈34%, and the emission light $L_{32}$ is 67−34~33%. All the incident light $L_{23}$ is emitted in the third region 2bc, so that the emission light $L_{33}$ is about 33%. In this way, it is possible to average the amount of emission lights $L_{31}$ to $L_{33}$ so as to have the same amount of light when the first surface 2b is composed of the plural regions having different Ws/Wp values, that is, different reflectance Rws. Thus, it is possible to reduce brightness unevenness due to the user's viewpoint position.

The first surface 2b is not limited to be composed of three regions 2ba to 2bc, but may be configured by two regions or four or more plural regions. For example, when the maximum number of reflections of the incident light $L_2$ on the second surface 2c is m times (m: a natural number more than or equal to 1), the first surface 2b is composed of (m+1) regions. In this case, the Ws/Wp value becomes smaller from the first region adjacent to the incident surface 2a to the (m+1) region, and will be zero in the (m+1) region. For example, when the first surface 2b is composed of four regions, the reflectance Rw in the first region is 3/4, the reflectance Rw in the second region is 2/3, the reflectance Rw in the third region is 1/2, and the reflectance Rw in the fourth region is 0. Then, when the first surface 2b is divided into the four regions, the light intensity of the emission light $L_3$ in the first region is 100×(1−3/4)=25%, the light intensity of the emission light $L_3$ in the second region is 75×(1−2/3)=25%, the light intensity of the emission light $L_3$ in the third region is 50×(1−1/2)=25%, and the light intensity of the emission light $L_3$ in the fourth region is the remaining 25%. As described above, when the first surface 2b is composed of the (m+1) regions, Wsk/(Wpk+Wsk) of the k-th region is represented by Wsk/(Wpk+Wsk)= (m+1−k)/(m+2−k), such that the amount of emission light $L_3$ becomes uniform among the regions. Note that k is an integer of 1 or more and equal to or less than m, and the reflectance in the (m+1) region is 0.

According to the present embodiment, in addition to the same effect as that of the first embodiment, the amount of emission light on the first surface 2b is averaged, and the optical member 1 has an effect of ensuring brightness.

Modification of Second Embodiment

Figure 10:
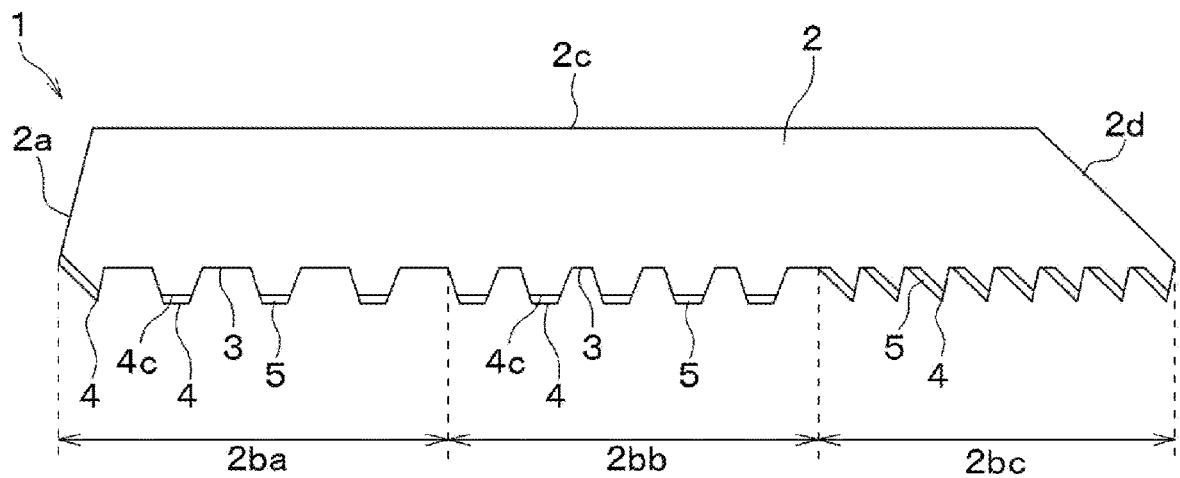
FIG. 10 is a cross-sectional view showing a modification of the optical member of the second embodiment.

As shown in FIG. 10, the prism portion 4 of the second embodiment may have a trapezoidal shape having a top side 4c, excluding the prism portion 4 closest to the incident surface 2a and the prism portion 4 farthest from the incident surface 2a in the third region 2bc. The trapezoidal prism portion 4 has the top side 4c between the ejection surface 4a and the facing surface 4b, and the top side 4c is covered with the light absorption film 5, as in the modification of the first embodiment. Further, the top side 4c may be parallel to the second surface 2c and at the same height as the apex of another prism portion 4 having no top side 4c. As a result, the trapezoidal prism portion 4 suppresses the generation of noise due to the reflection of the incident light $L_2$ on the facing surface 4b. In the region where the prism portions 4 are adjacent to each other, it is difficult to form a sufficiently wide top side 4c on the prism portion 4, so that only the prism portion 4 adjacent to the flat portion 3 has a trapezoidal shape with the top side 4c.

According to this modification, the optical member 1 has the same effect as that of the second embodiment and also has the effect of suppressing the generation of noise in the region having the trapezoidal prism portion 4.

Third Embodiment

Figure 13:
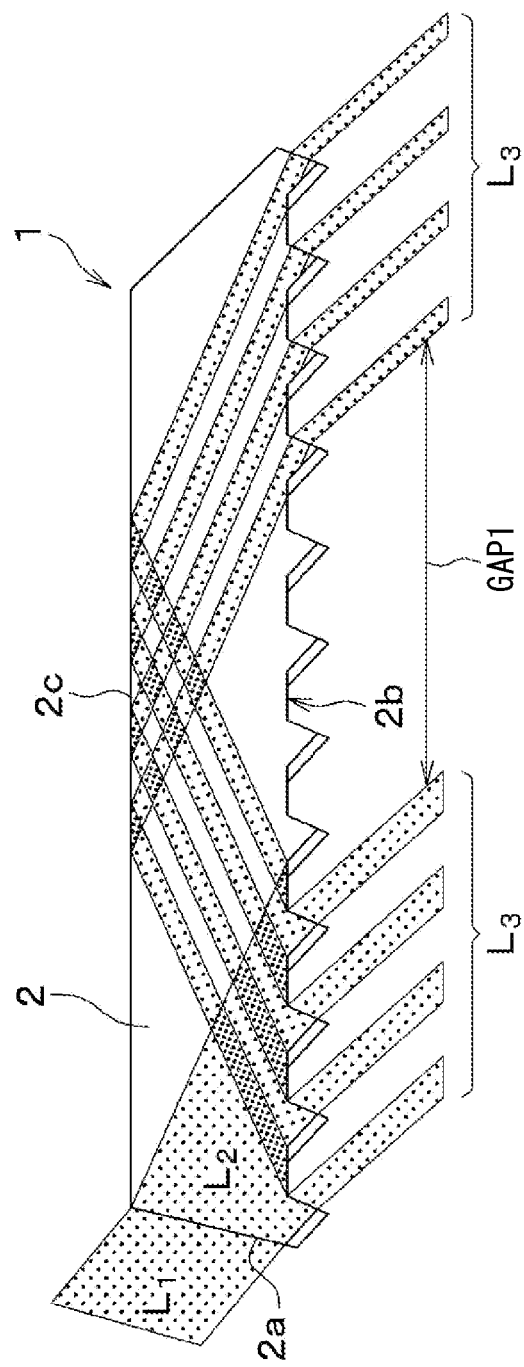
FIG. 13 is an explanatory diagram for explaining a gap between rays on the first surface.
Figure 14:
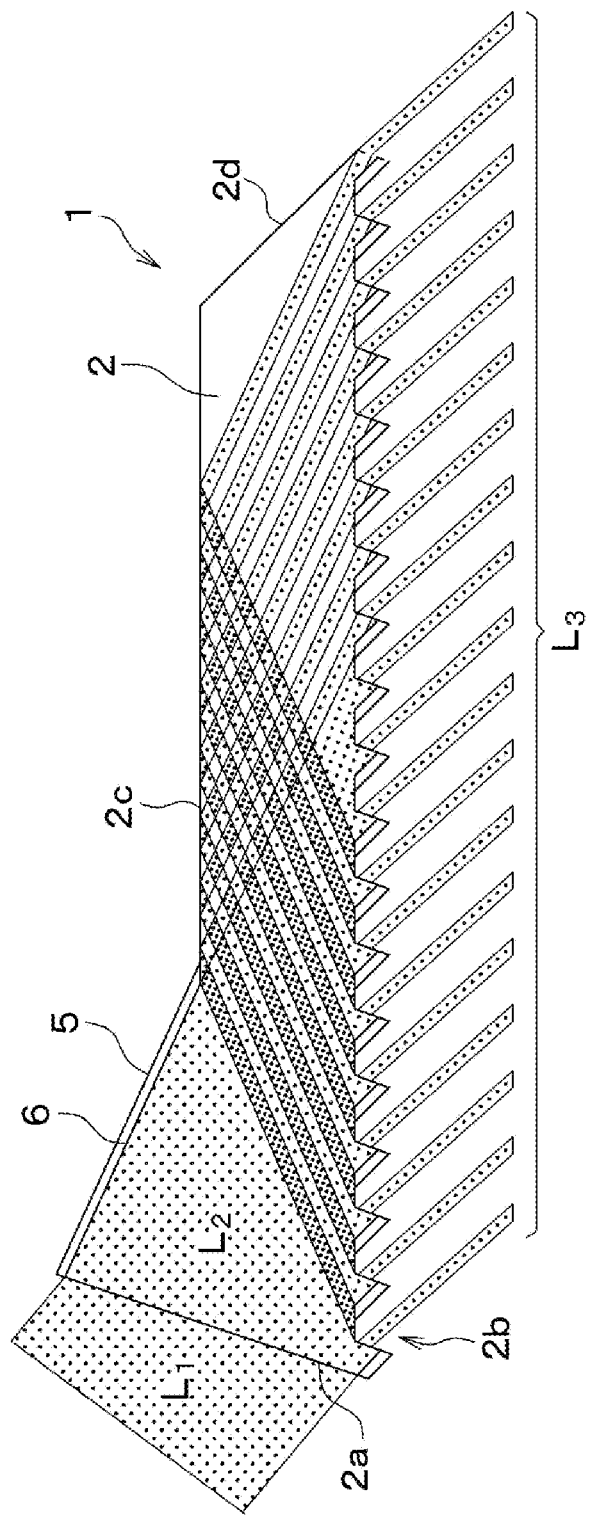
FIG. 14 is an explanatory diagram for explaining a suppression of the gap in the optical member of the third embodiment.

The optical member 1 of the third embodiment will be described with reference to FIGS. 11 to 16. In FIGS. 13 and 14, in order to make the light guided in the optical member 1 easy to understand, the outside light $L_1$, the incident light $L_2$, and the emission light $L_3$ are hatched.

Figure 11:
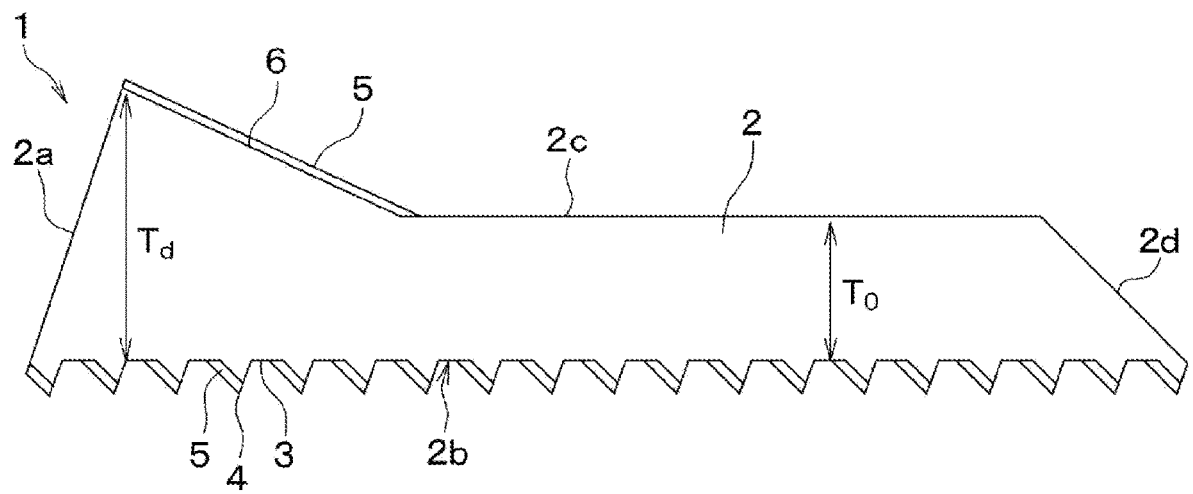
FIG. 11 is a cross-sectional view showing an optical member according to a third embodiment.

In the optical member 1 of the present embodiment, as shown in FIG. 11, the light guide body 2 has a fourth surface 6 between the incident surface 2a and the second surface 2c, differently from the first embodiment, and the fourth surface 6 protrudes from the second surface 2c. This different point will be mainly described in the present embodiment.

In the present embodiment, the light guide body 2 has the fourth surface 6 connecting the incident surface 2a and the second surface 2c, and the fourth surface 6 has a shape protruding outward from the second surface 2c. The height To is a distance between the second surface 2c and the flat portion 3 in the normal direction of the flat portions. The height Td is a distance between an end of the incident surface 2a adjacent to the fourth surface 6 and the flat portion 3 in the normal direction. The light guide body 2 is configured to satisfy a relationship of Td>To.

Figure 12:
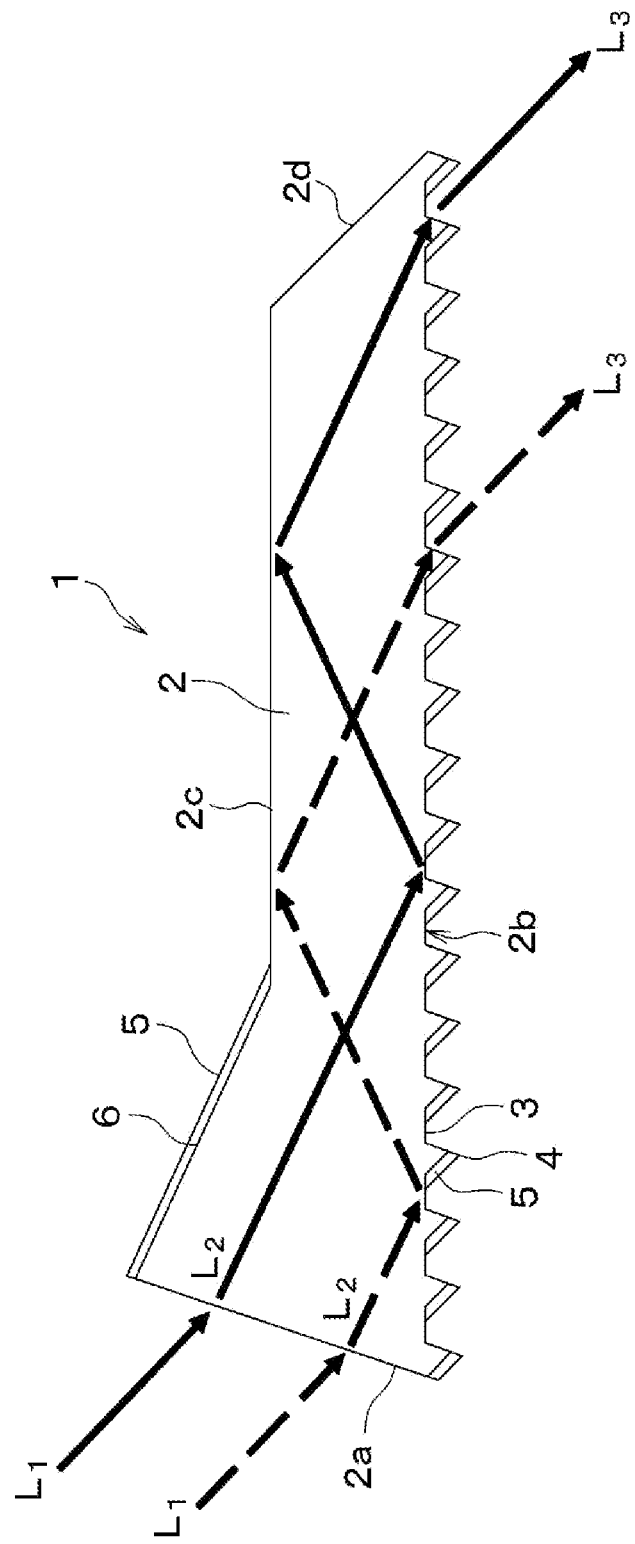
FIG. 12 is an explanatory diagram for explaining a light guided in the optical member of the third embodiment.

In the present embodiment, as shown in FIG. 12, due to the fourth surface 6, the area of the incident surface 2a of the light guide body 2 is increased compared with the above embodiments. Therefore, the light guide body 2 can guide more light since the area in which the incident light $L_2$ from the incident surface 2a reaches the first surface 2b for the first time is increased. Thus, a gap between the guided rays does not occur.

The "gap between the rays" will be described with reference to FIG. 13. If the light guide body 2 does not have the fourth surface 6, and the incident surface 2a and the second surface 2c intersect adjacently to each other, for example, as shown in FIG. 13, the emission lights $L_3$ are emitted in a state of being separated across the flat portions 3 and prism portions 4. A large gap GAP1 between the emission lights $L_3$ through the flat portions 3 and the prism portions 4 is the "gap between the rays", where the guided outside light $L_1$ cannot be visually recognized by the user. That is, if there is a gap between the guided lights, it is not possible to secure the continuity of the outside light $L_1$ on the first surface 2b, that is, the continuity of the display for the user.

In contrast, in the optical member 1 of the present embodiment, the light guide body 2 has the fourth surface 6, and the height Td of the incident surface 2a is larger than the height To of the second surface 2c. As a result, as shown in FIG. 14, the incident light $L_2$ reaches a wide area of the first surface 2b, and is reflected by the flat portion 3. Thus, the area of the second surface 2c where the incident light $L_2$ reaches for the first time also increases. Therefore, there will be no gap between the region of the first surface 2b where the incident light $L_2$ first reaches and the region of the first surface 2b where the incident light $L_2$ reaches again after being reflected by the flat portion 3 and the second surface 2c. As a result, as shown in FIG. 14, the emission light $L_3$ is emitted from all the prism portions 4 of the first surface 2b, and no gap between the rays is generated. Therefore, according to the optical member 1 of the present embodiment, a gap between the rays does not occur and the display continuity is ensured.

The fourth surface 6 is covered with the light absorption film 5 in order to suppress the generation of noise such as ghost images due to unintended intrusion of external light and interfacial reflection. Specifically, when a light ray having an angle smaller than the incident angle $\theta_1$ is incident on the incident surface 2a, a part of the light ray reaches the fourth surface 6. The light absorption film 5 absorbs the light that reaches the fourth surface 6 in this way, such that unintended light such as the light reflected at a portion different from the second surface 2c is restricted from being directed toward the first surface 2b. Thus, the generation of noise such as ghost images can be restricted.

As shown in FIG. 11, the fourth surface 6 is a tilt surface that linearly connects the end of the incident surface 2a and the end of the second surface 2c. The fourth surface 6 is designed so that the inclination angle $\xi$ with respect to the normal direction does not cause a "gap between rays" in the guide of the incident light $L_2$ from the incident surface 2a.

Figure 15:
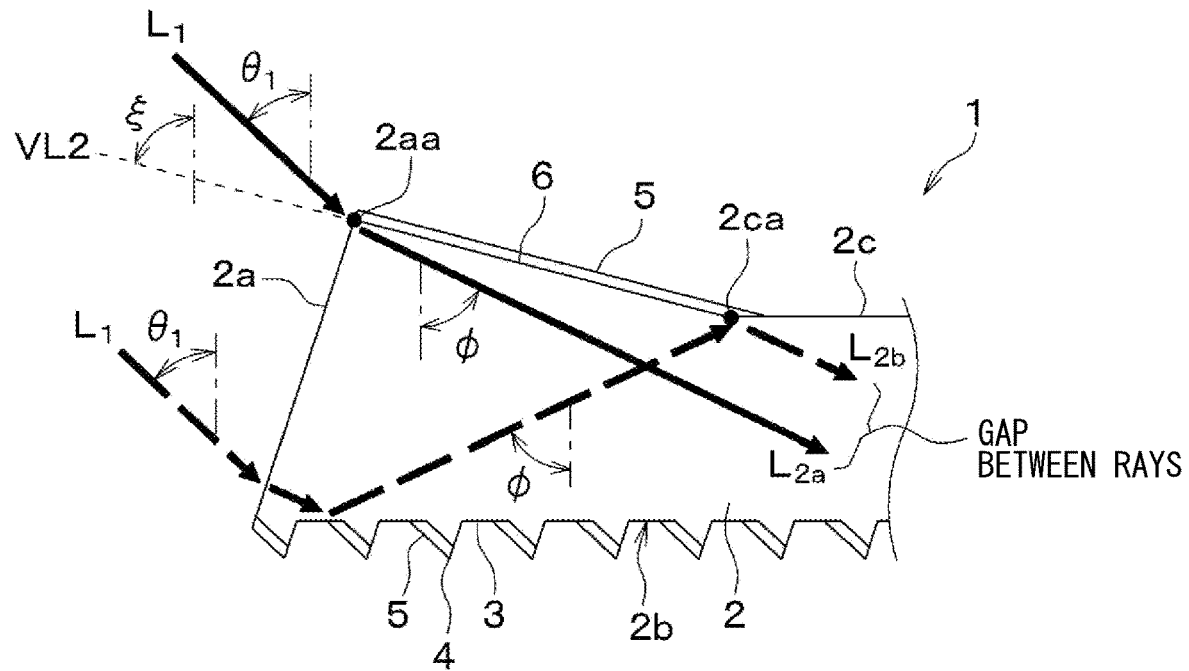
FIG. 15 is an explanatory diagram for explaining a relationship between the gap and an angle of a tilt surface between the incident surface and the second surface.

Specifically, as shown in FIG. 15, when the inclination angle $\xi$ of the fourth surface 6 is larger than the guide angle $\phi$ of the incident light $L_2$, a gap between rays may occur.

Hereinafter, for convenience of explanation, the end of the incident surface 2a adjacent to the second surface 2c is referred to as "first end portion 2aa", and a part of the incident light incident from the vicinity of the first end portion 2aa is referred to as "incident light $L_{2a}$". Further, the end of the second surface 2c adjacent to the incident surface 2a is referred to as "second end portion 2ca", and a part of the incident light reflected in the vicinity of the second end portion 2ca is referred to as "incident light $L_{2b}$".

When the inclination angle $\xi$ of the fourth surface 6 is larger than the guide angle $\phi$, the incident light $L_{2a}$ passes through a position away from the second end 2ca, and there is a gap between the incident light $L_{2a}$ and the incident light $L_{2b}$ reflected in the vicinity of the second end portion 2ca. The gap between the incident light Lza and the incident light $L_{2b}$ is the "gap between rays". When the gap between the rays is generated, the incident light $L_2$ may not reach a part of the prism portions 4 on the first surface 2b. In this case, a gap between the rays is generated, and the continuity of the display cannot be ensured.

Figure 16:
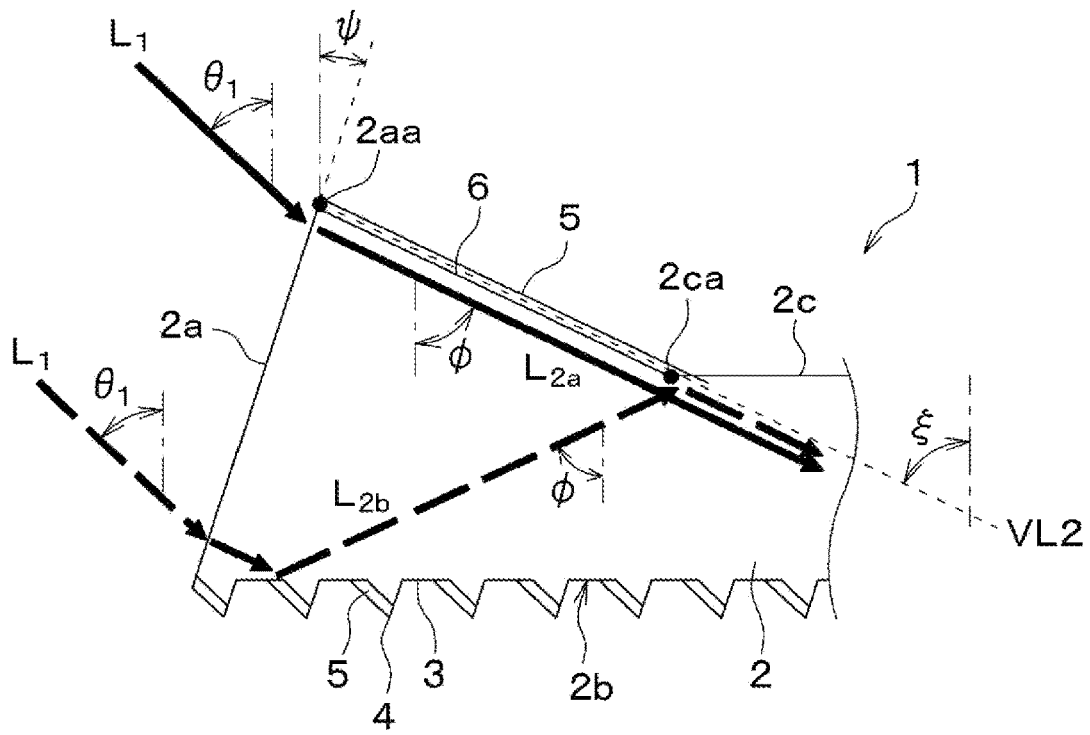
FIG. 16 is a diagram showing a suppression of the gap due to the angle of the tilt surface between the incident surface and the second surface.

Therefore, the fourth surface 6 is configured to satisfy that the inclination angle $\xi$ is smaller than the guide angle. In this case, as shown in FIG. 16, the incident light $L_{2a}$ passes in the vicinity of the second end portion 2ca, and there is no gap between the incident light $L_{2a}$ and the incident light $L_{2b}$. As a result, the light guide body 2 does not have a gap between the rays, i.e., a gap between lights guided, and the optical member 1 can secure the continuity of display on the first surface 2b.

Further, in the fourth surface 6, in case where the incident angle $\theta_1$ of the outside light $L_1$ has variation as $\theta_1 \pm \Delta\theta_1$ and the guide angle $\phi$ of the incident light $L_2$ has variation as $\phi \pm \Delta\phi$, when the inclination angle $\xi < \phi - \Delta\phi$ is satisfied, it is possible to suppress the generation of the gap between rays within the range of $\theta_1 \pm \Delta\theta_1$.

Figure 17:
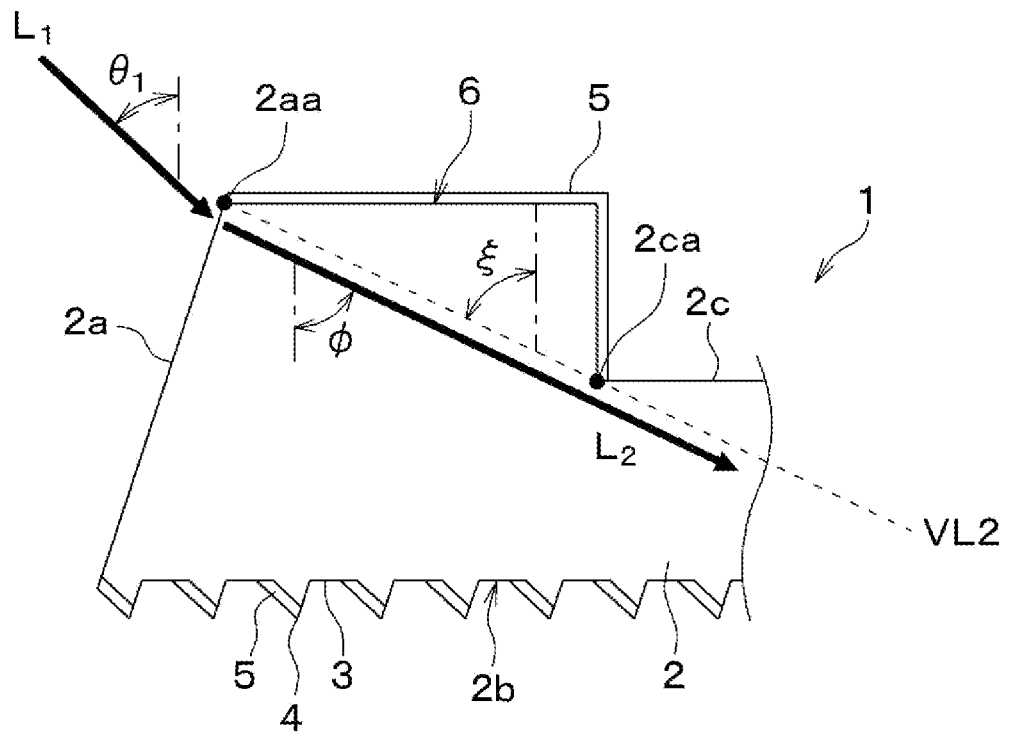
FIG. 17 is a cross-sectional view showing a fourth surface in the optical member of the third embodiment.

In the above, the fourth surface 6 is a tilt surface and the inclination angle $\xi$ is smaller than the guide angle $\phi$ as a typical example, but the fourth surface 6 is not limited to the one tilt surface and may have plural surfaces or a curved surface. For example, as shown in FIG. 17, the fourth surface 6 may have a rectangular shape having two surfaces. When the fourth surface 6 has a configuration other than one tilt surface, the outer shape is not particularly limited while the incident light $L_2$ incident from the vicinity of the first end portion 2aa passes through the vicinity of the second end portion 2ca. Specifically, as shown in FIGS. 16 and 17, the inclination angle ξ is formed by the virtual straight line VL2 connecting the first end portion 2aa and the second end portion 2ca and the normal direction. Therefore, the fourth surface 6 may have any shape while it satisfies ξ<φ, but the region from the first end portion 2aa to the second end portion 2ca is covered with the light absorption film 5.

The incident surface 2a preferably has the inclination angle ψ smaller than $\pi/2-\theta_1$. When the incident surface 2a, which refracts the outside light $L_1$, satisfies $\psi<\pi/2-\theta_1$, the guide angle φ of the incident light $L_2$ after the refraction becomes larger than the incident angle $\theta_1$ of the outside light $L_1$. As a result, the light guide body 2 is configured such that the initial reach width of the incident light $L_2$ is wider, while the light guide width, that is, the height To of the second surface 2c can be restricted, compared with a case where the light guide angle is assumed to be $\theta_1$.

According to the present embodiment, in addition to the same effect as that of the first embodiment, the optical member 1 has an effect that a gap between guided rays does not occur and a continuity of display on the first surface 2b can be ensured.

Modification of Third Embodiment

Figure 18:
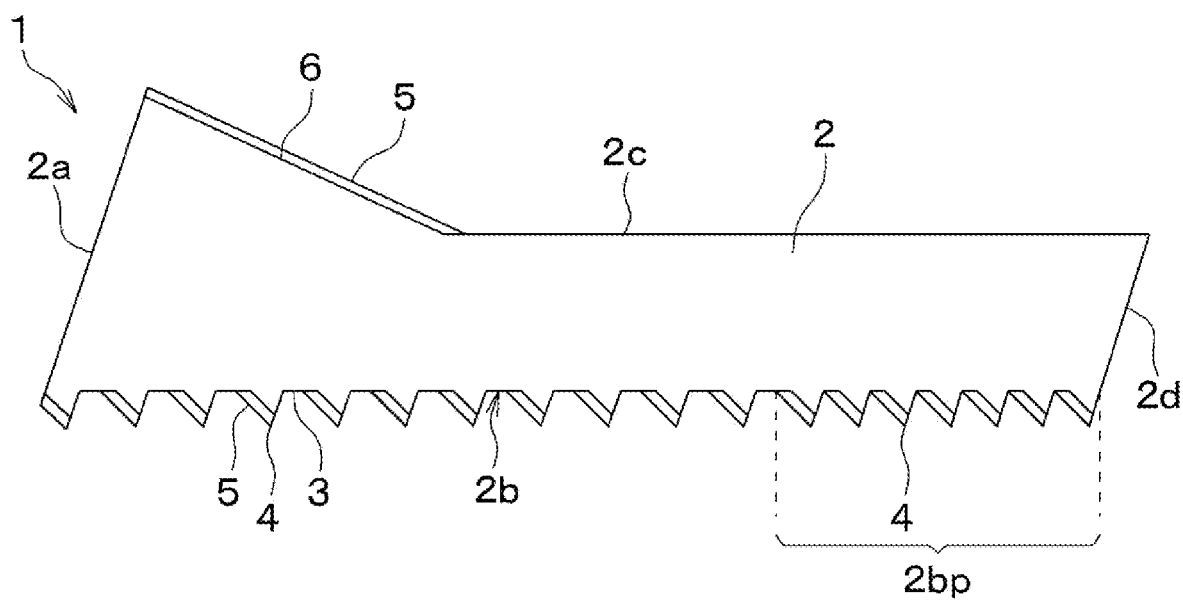
FIG. 18 is a cross-sectional view showing a modification of the optical member of the third embodiment.

As shown in FIG. 18, in the optical member 1 of the third embodiment, the first surface 2b has a prism region 2bp consisting of only the prism portions 4. Further, the third surface 2d is a tilt surface having continuity with the ejection surface 4a of the prism portion 4 closest to the third surface 2d. In other words, the third surface 2d is the end surface of the light guide body 2 and is parallel to the incident surface 2a together with the ejection surface 4a.

Figure 19:
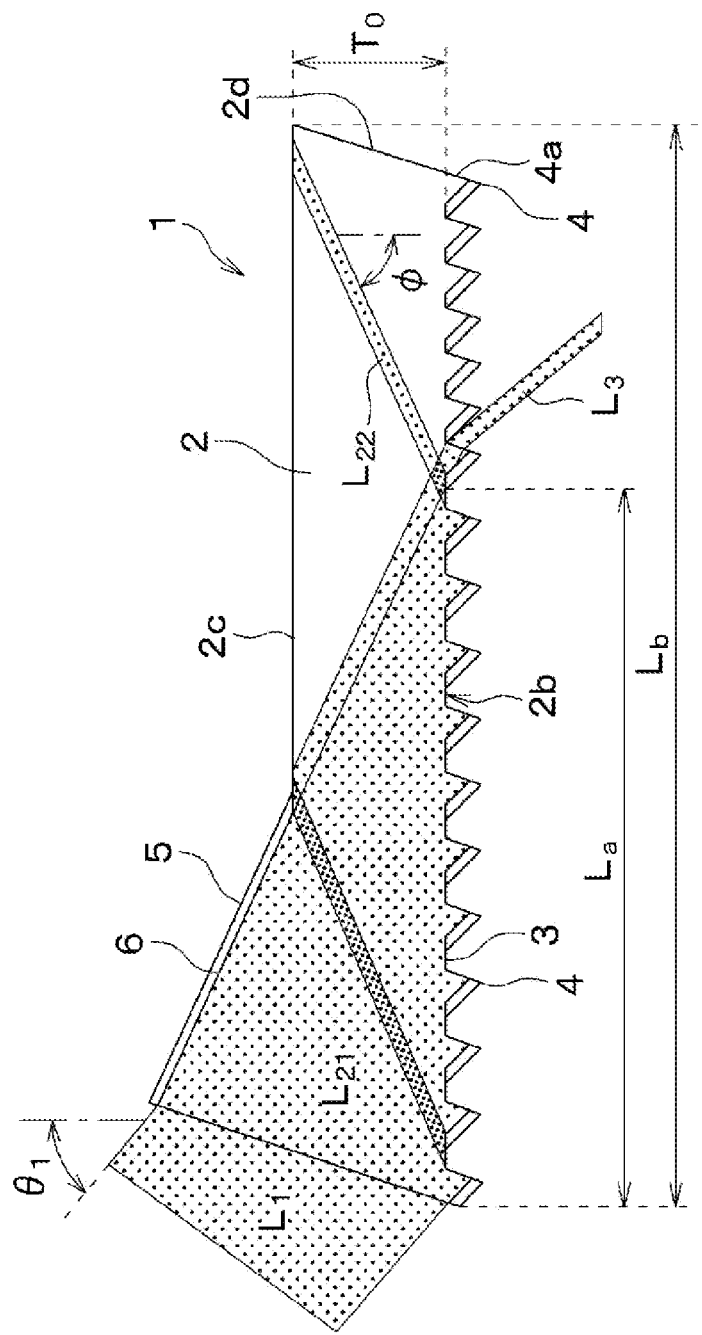
FIG. 19 is an explanatory diagram for explaining a first surface of the optical member of FIG. 18.

As shown in FIG. 19, the light guide body 2 has the width $L_a$ in the light guide direction, and the first surface 2b from the end adjacent to the incident surface 2a to the prism region 2bp has the width $L_b$ in the light guide direction. The light guide body 2 is configured to satisfy Formula (4) and Formula (5).

$La=(2N-1) \times To \times \tan\phi$      Formula (4):

$Lb=2N \times To \times \tan\phi$      Formula (5):

N in Formula (4) and Formula (5) is a positive integer. When the light guide body 2 satisfies Formula (4) and Formula (5), the end ($L_{22}$ in FIG. 19) of the incident light $L_2$ that reaches the second surface 2c due to repeated reflection on the first surface 2b coincides with the end surface which is the upper end of the third surface 2d. As a result, only the light rays reflected by the second surface 2c are incident on the third surface 2d, but the light rays reflected by the first surface 2b are not incident on the third surface 2d. That is, the emission light from the third surface 2d is emitted only toward the first surface 2b and not toward the second surface 2c. Therefore, the light guide body 2 can emit the guided light in the viewing direction of the user without waste.

Further, in addition to satisfying Formula (4) and Formula (5), by setting a part of the first surface 2b that exceeds $L_a$ as the prism region 2bp, all the incident light $L_2$ that has reached the prism region 2bp can be emitted in the viewing direction of the user. That is, the number of prism portions 4 in the area exceeding $L_a$ can be minimized, and the length of the light guide body 2 in the light guide direction can be reduced.

The value $L_a$ may be in the range of +10% of the value represented by $(2N-1) \times To \times \tan\phi$. Further, $L_b$ may be in the range of ±10% of the value represented by $2N \times To \times \tan\phi$. This is because a deviation of about 10% can occur depending on the angle of the incident light. The effect of minimizing the loss of the guided light is expected when each of $L_a$ and $L_b$ is within the above range.

According to this modification, in addition to the effect of the third embodiment, the optical member 1 has an effect of suppressing the loss of the guided light. Further, in the optical member 1, the length of the light guide body 2 in the light guide direction is minimized.

Fourth Embodiment

Figure 22:
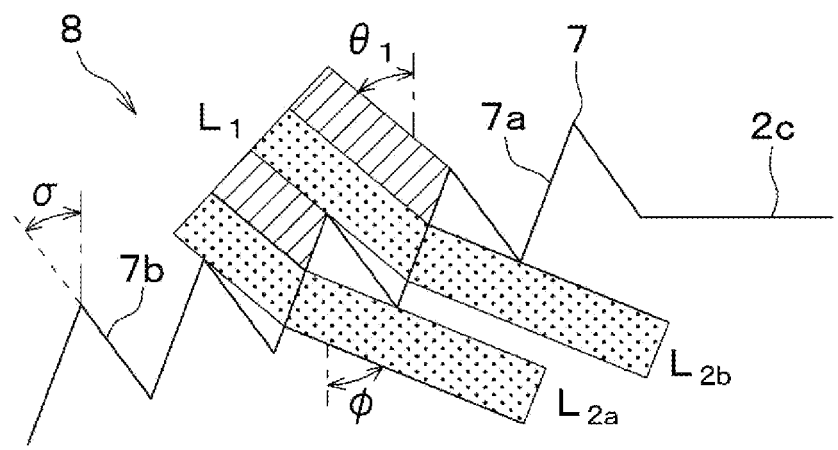
FIG. 22 is an explanatory diagram for explaining a relationship between an angle of a tilt surface of a second prism portion of an incident portion and a gap between rays.
Figure 23:
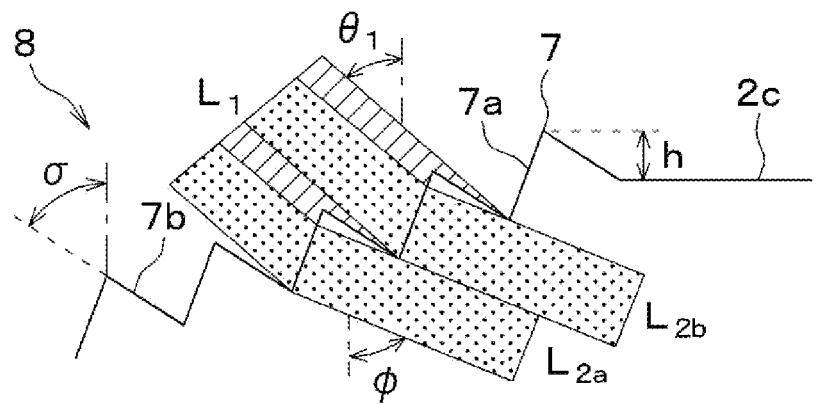
FIG. 23 is an explanatory diagram for explaining a suppression of the gap due to the angle of the tilt surface of the second prism portion of the incident portion.

The optical member 1 of the fourth embodiment will be described with reference to FIGS. 20 to 23. In FIGS. 22 and 23, the outside light $L_1$ and the incident light $L_2$ are hatched. A part of the outside light $L_1$ that is incident on the light guide body 2 and a part of the outside light $L_1$ that is not incident on the light guide body 2 are shown by different hatching.

Figure 20:
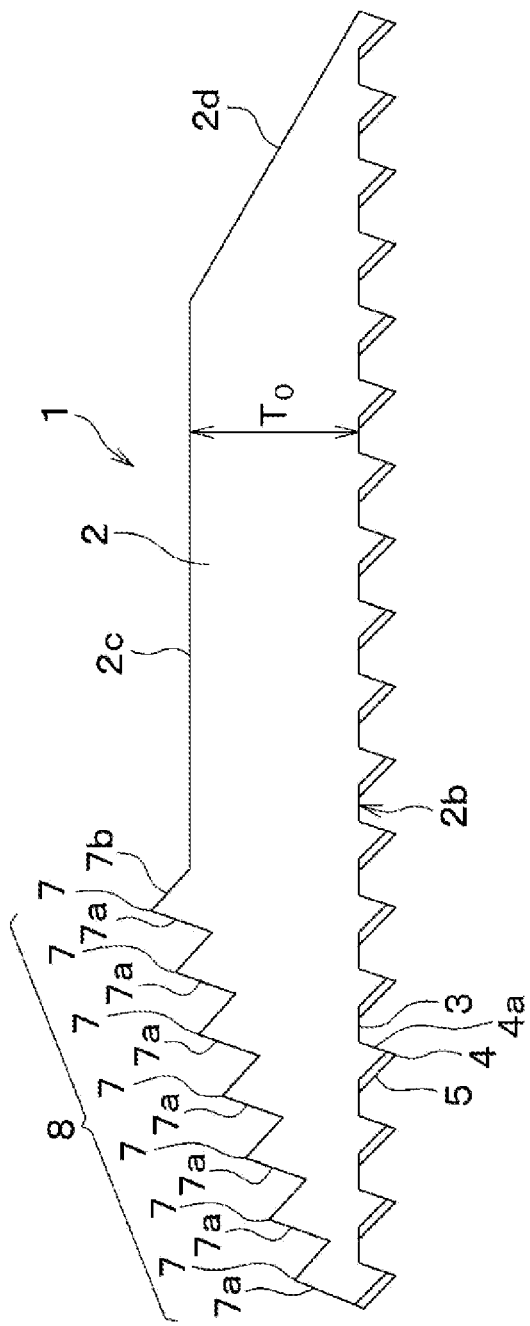
FIG. 20 is a cross-sectional view showing an optical member according to a fourth embodiment.

As shown in FIG. 20, the optical member 1 of the present embodiment has an incident portion 8 composed of plural second prism portions 7. The incident portion 8 is an outer surface connecting the first surface 2b and the second surface 2c of the light guide body 2, and is opposite to the third surface 2d. This point different from the first embodiment will be mainly described in the present embodiment.

In the present embodiment, the light guide body 2 has the incident portion 8 which is a region between the first surface 2b and the second surface 2c and located on the opposite side of the third surface 2d. The incident portion 8 is composed of the second prism portions 7 while the prism portions 4 on the first surface 2b are referred to as the "first prism portion".

The second prism portion 7 is shaped to have a first surface 7a corresponding to the incident surface 2a and a second surface 7b adjacently intersecting the first surface 7a. The second prism portions 7 are adjacent to each other and are arranged in parallel along the direction connecting the first surface 2b and the second surface 2c.

Hereinafter, for convenience of explanation, a direction connecting the first surface 2b and the second surface 2c is referred to as "prism arrangement direction". The second prism portions 7 are arranged in the prism arrangement direction.

Figure 21:
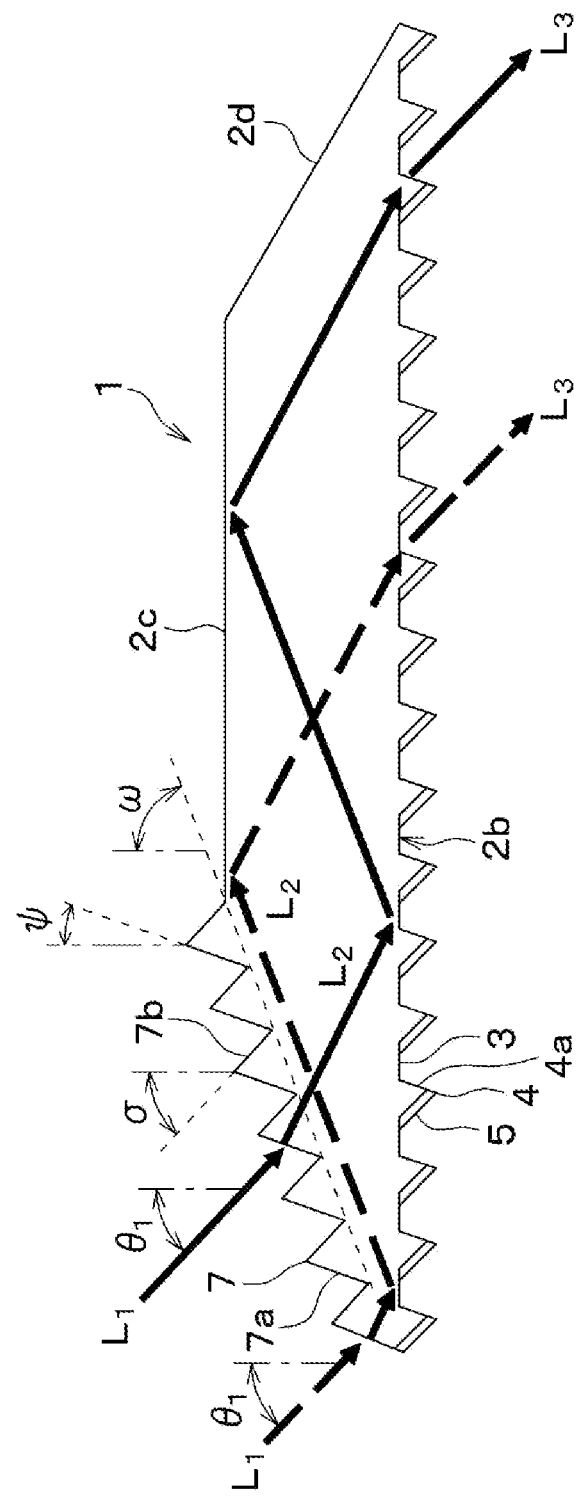
FIG. 21 is an explanatory diagram for explaining a light guided in the optical member of the fourth embodiment.

As shown in FIG. 21, the second prism portion 7 has an angle ψ formed between the prism arrangement direction and the normal direction of the flat portion, and the angle ψ is smaller than or equal to the guide angle φ.

In the second prism portions 7, the first surface 7a is substantially parallel to the ejection surface 4a of the first surface 2b. As shown in FIG. 21, the first surface 7a has an angle ψ formed with the normal direction, and the angle ψ is set to, for example, the same degree as the inclination angle of the incident surface 2a in each of the embodiments.

In the second prism portion 7, the angle σ is formed between the plane of the second surface 7b and the normal direction. The angle σ is larger than or equal to the incident angle $\theta_1$ of the outside light $L_1$ and smaller than or equal to the guide angle φ of the incident light $L_2$. That is, it is preferable to satisfy $\theta_1 \leq \sigma \leq \phi$, so as to restrict the formation of a gap between the light rays incident from the first surface 7a.

Specifically, when $\sigma<\theta_1$, as shown in FIG. 22, a light ray of the outside light $L_1$ incident from the first surface 7a of the second prism portion 7 reaches a position between the apex and the valley of the second prism portion 7 and escapes to the outside. Further, since a part of the outside light $L_1$ is blocked by the adjacent second prism portion 7, the outside light $L_1$ does not reach the entire area of the first surface 7a except for the second prism portion 7 located the most adjacent to the first surface 2b, among the second prism portions 7. As a result, a gap is generated between the incident light $L_{2a}$ from the first surface 7a of a certain second prism portion 7 and the incident light $L_{2b}$ from the first surface 7a of the second prism portion 7 adjacent to the certain second prism portion 7. In this case, a moire may be caused since a gap is generated in the incident light from the first surface 7a and a periodic light ray reach the first surface 2b.

When $\theta d \leq \sigma \leq \phi$ is satisfied, as shown in FIG. 23, a part of the outside light $L_1$ is incident from the first surface 7a of a certain second prism portion 7, and reaches between the apex and the valley of the second prism portion 7 so as to escape to the outside. However, when $\theta_1 \leq \sigma \leq \phi$ is satisfied, the proportion of light escaping to the outside is smaller, compared with a case where $\sigma < \theta_1$ is satisfied. Further, the outside light $L_1$ reaches the entire area of the first surface 7a of the second prism portion 7 without being blocked by the adjacent second prism portion 7. As a result, no gap is formed between the incident light $L_{2a}$ from a certain second prism portion 7 and the incident light $L_{2b}$ from the adjacent second prism portion 7, and it is possible to suppress the occurrence of moire.

As shown in FIG. 23, when the height of the second prism portion 7 in the normal direction is h and $\omega = \phi$ is satisfied, the maximum height of the incident portion 8 in the normal direction is To+h.

According to the present embodiment, the optical member 1 has the same effect as that of the first embodiment.

Fifth Embodiment

Figure 25:
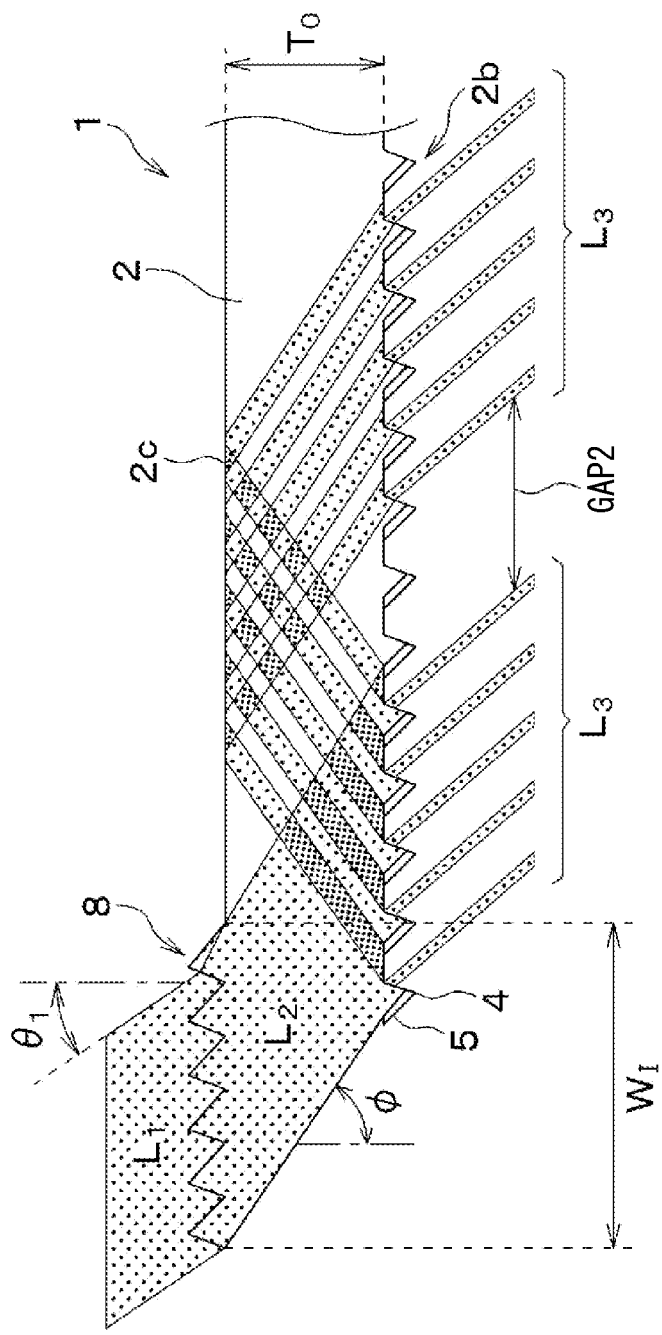
FIG. 25 is an explanatory diagram for explaining a generation of a gap due to a width of the incident portion.
Figure 26:
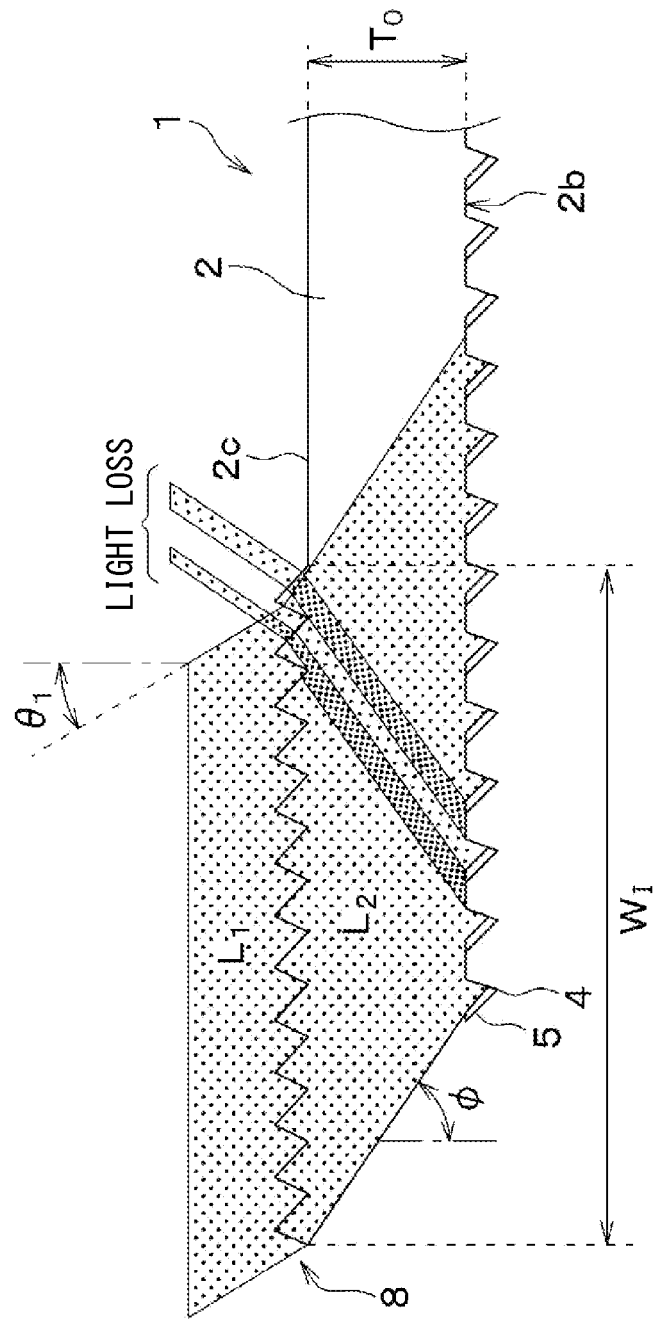
FIG. 26 is an explanatory diagram for explaining a loss of light due to a width of the incident portion.
Figure 27:
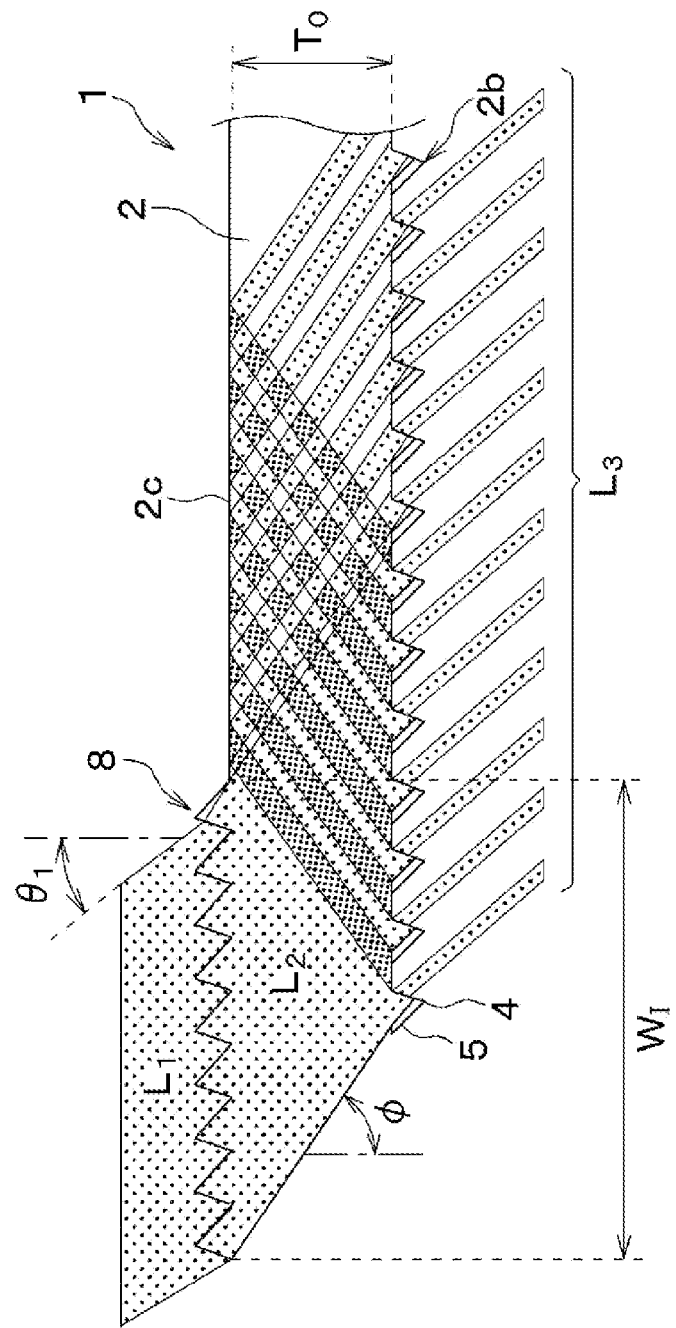
FIG. 27 is an explanatory diagram for explaining a suppression of the loss of light and a suppression of the gap due to a width of the incident portion.

The optical member 1 of the fifth embodiment will be described with reference to FIGS. 24 to 27. In FIGS. 25 to 27, in order to make the light guided in the optical member 1 easy to understand, a part of the outside light $L_1$, the incident light $L_2$, and the emission light $L_3$ are shown and hatched.

Figure 24:
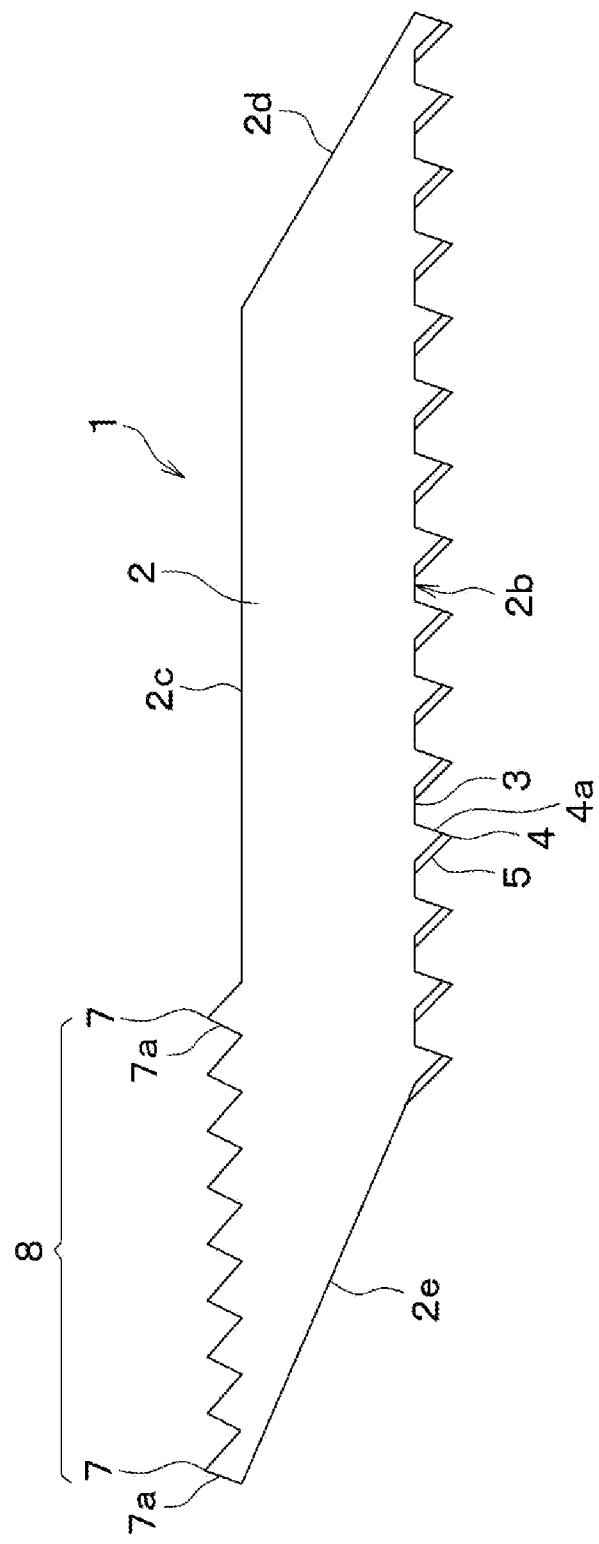
FIG. 24 is a cross-sectional view showing an optical member according to a fifth embodiment.

In the optical member 1 of the present embodiment, as shown in FIG. 24, the light guide body 2 has the incident portion 8 adjacent to the second surface 2c. The incident portion 8 and the second surface 2c are arranged opposite to the first surface 2b. The present embodiment is different from the first embodiment in that the light guide body 2 has a fifth surface 2e connecting the incident portion 8 and the first surface 2b. This different point will be mainly described in the present embodiment.

In the present embodiment, the light guide body 2 has the incident portion 8 and the prism arrangement direction is along a surface formed by the second surface 2c. The fifth surface 2e is defined between the incident portion 8 and the first surface 2b. The incident portion 8 is composed of the second prism portions 7 adjacent to each other and arranged in parallel, as in the fourth embodiment. Further, in the second prism portion 7, the first surface 7a is substantially parallel to the ejection surface 4a on the first surface 2b.

In the present embodiment, the incident portion 8 has a configuration in which the valleys of the second prism portions 7 are located on the plane formed by the second surface 2c. That is, in the incident portion 8, a virtual plane formed by the valleys of the second prism portions 7 is arranged in parallel with the flat portions 3. As a result, the lengths of optical path of the light rays that reach the first surface 2b from the incident portion 8 for the first time are the same regardless of the position in the incident portion 8. Therefore, the distortion of the external view image visually recognized by the user by the emission light $L_3$ is minimized. The length of optical path is constant when the incident light $L_2$ incident from the incident portion 8 is reflected by the flat portion 3 and reaches the second surface 2c. The length of optical path is constant when the incident light $L_2$ reflected by the second surface 2c reaches the first surface 2b.

The incident portion 8 has the width $W_I$ in the light guide direction, and it is preferable that the width $W_I$ satisfies Formula (6) from the viewpoint of minimizing the gap between the rays on the first surface 2b while suppressing the light loss.

$$W_I = 2T_0 \times \tan\phi \qquad \text{Formula (6):}$$

When $W_I < 2T_0 \times \tan \phi$, as shown in FIG. 25, the area of the first surface 2b where the incident light $L_2$ reaches for the first time from the incident portion 8 becomes smaller. As a result, a gap GAP2 is generated between the emission light $L_3$ that reaches the first surface 2b for the first time and the emission light $L_3$ that reaches the first surface 2b after being reflected once by the flat portion 3 and the second surface 2c.

When $W_I > 2T_0 \times \tan \phi$, as shown in FIG. 26, the area of the first surface 2b where the incident light $L_2$ reaches for the first time from the incident portion 8 becomes larger. Therefore, there is no gap between the guided rays. However, since the area of the second surface 2c where the reflected light reaches becomes larger, a part of the light reflected by the first surface 2b for the first time reaches the incident portion 8. Since the incident portion 8 does not have a reflecting surface toward the first surface 2b, when the incident light $L_2$ from the first surface 2b reaches the incident portion 8, the light is transmitted to the outside. Thus, when $W_I > 2T_0 \times \tan \phi$, a loss in light ray occurs, since a part of light ray escapes from the incident portion 8 to the outside.

When $W_I = 2T_0 \times \tan \phi$, as shown in FIG. 27, in the light guide body 2, the area of the first surface 2b where the incident light $L_2$ reaches for the first time from the incident portion 8 becomes large, while the reflected light reaches only the second surface 2c. As a result, a gap is not generated between the emission lights $L_3$ emitted from the first surface 2b, while being separated by the flat portion 3 and the prism portion 4. Thus, the loss in light from the incident portion 8 is suppressed. Since a deviation of about 10% can occur depending on the angle of the incident light, if the $W_I$ is within the range of ±10% of the value represented by $2T_0 \times \tan \phi$, the loss in light can be reduced and the influence by the gap can be reduced.

According to the present embodiment, the optical member 1 has the same effect as that of the first embodiment. Further, the incident portion 8 and the first surface 2b are substantially parallel to each other, and the length of optical path in the light guide body 2 is constant regardless of the position of the incident portion 8. Therefore, the optical member 1 is not affected by the arrangement of the light guide body 2. For example, even if the light guide body 2 is rotated around a direction other than the normal direction, the light rays horizontally incident on the incident portion 8 are emitted horizontally from the first surface 2b. Therefore, the optical member 1 is not affected by the arrangement such as mounting posture of the light guide body 2.

Other Embodiments

Although the present disclosure has been described in accordance with the embodiments, it is understood that the present disclosure is not limited to such embodiments or structures. The present disclosure also includes various modifications and modifications within an equivalent range. In addition, various combinations and modes, and further, other combinations and modes including one element of these alone, or thereabove, or therebelow, are also comprised within the scope or concept range of the present disclosure.

In the third to fifth embodiments, a part of the prism portions 4 along the first surface 2b may have a trapezoidal shape in which the top side 4c is defined. Further, in the fourth and fifth embodiments, the first surface 2b may have plural regions among which the ratio of the width Ws of the flat portion 3 and the width Wp of the prism portion 4 is different. As described above, the optical member 1 is not limited to each of the embodiments and modifications thereof, and may be freely combined unless it is clearly incompatible.

What is claimed is:

1. An optical member comprising:
   a light guide body having an incident surface on which an outside light is incident,
   a first surface having a plurality of flat portions and a plurality of prism portions, an incident light incident from the incident surface reaching the first surface for the first time, and
   a second surface arranged opposite to the plurality of flat portions, wherein
   the plurality of flat portions is a first reflecting surface to totally reflect the incident light toward the second surface,
   the second surface is a second reflecting surface to totally reflect a reflected light, reflected by the first reflecting surface, toward the first surface,
   the plurality of prism portions has an ejection surface to emit a part of the incident light or a part of light reflected by the second surface to outside,
   the plurality of prism portions arranged on the first surface is a first prism portion,
   the light guide body has an incident portion having a plurality of second prism portions, and
   the incident surface comprises an outer surface of each of the plurality of second prism portions and is parallel to the ejection surface of the first prism portions.

2. The optical member according to claim 1, wherein
   an incident angle of the incident light with respect to a flat surface formed by the plurality of flat portions and an incident angle of the light reflected by the flat portion with respect to the second surface are defined as $\Phi$,
   a refractive index of the light guide body is defined as $n_1$,
   a refractive index of a medium in contact with the light guide body is defined as $n_2$, and
   the light guide body satisfies a relationship of $\sin \Phi > n_2/n_1$.

3. The optical member according to claim 2, wherein
   an angle between an incident direction of the outside light on the incident surface and a normal direction with respect to the flat portions is defined as $\theta_1$,
   an angle between the incident surface and the normal direction is defined as $\psi$, and
   the light guide body satisfies a relationship of $\Phi > \theta_1$ and $\pi/2 - \Phi > \psi$.

4. The optical member according to claim 1, wherein
   the incident portion is arranged on a plane formed by the second surface.

5. The optical member according to claim 1, wherein
   a normal direction is defined with respect to a flat surface formed by the flat portions,
   an end point of the incident surface opposite to the first surface is defined as a first end portion,
   a distance between the first end portion and the flat surface in the normal direction is defined as a height Td,
   a distance between the flat portion and the second surface in the normal direction is defined as a height To,
   the incident surface satisfies a relationship of Td>To,
   an end point of the second surface adjacent to the incident surface is defined as a second end portion,
   an angle formed between the normal direction and a virtual straight line connecting the first end portion and the second end portion is defined as $\xi$,
   an incident angle of the incident light with respect to the flat surface is defined as $\Phi$, and
   the light guide body satisfies a relationship of $\xi < \Phi$.

6. The optical member according to claim 5, wherein
   the light guide body is covered with a light absorption film within a region from the first end portion to the second end portion.

7. The optical member according to claim 1, wherein
   the first surface has a plurality of regions, a ratio of widths of the prism portion and the flat portion adjacent to each other being different among the plurality of regions,
   a ratio of the width of the flat portion to the width of the prism portion is smaller as the plurality of regions is located farther from the incident surface, and
   the width of the flat portion is zero in a region farthest from the incident surface.

8. The optical member according to claim 7, wherein
   the number of the plurality of regions is defined as m+1 (m: natural number of 1 or more),
   a width of the prism portion is defined as Wpk and a width of the flat portion is defined as Wsk in a k-th ($1 \le k \le m$) region from the incident surface among the plurality of regions, and
   the k-th region satisfies a relationship of Wsk/(Wpk+Wsk)= (m+1−k)/(m+2−k).

9. The optical member according to claim 7, wherein
   a height To is defined as a distance between the second surface and the flat portion in a normal direction of the flat portion,
   the incident light has an incidence angle $\Phi$ relative to the normal direction of the flat portion, and
   a width WI of the incident portion is within a range ±10% of a value represented by 2To×tan $\Phi$.

10. The optical member according to claim 1, wherein
    the plurality of flat portions is parallel to the second surface.

11. The optical member according to claim 1, wherein
    the ejection surface is parallel to the incident surface.

12. The optical member according to claim 1, wherein
    a width of the prism portion is defined as Wp and a width of the flat portion adjacent to the prism portion is defined as Ws,
    an angle formed between an incident direction of the outside light on the incident surface and a normal direction with respect to a flat surface formed by the flat portions is defined as $\theta_1$, and
    the first surface satisfies a relationship pf (Wp+Ws)cos $\theta_1$ <2 mm.

13. The optical member according to claim 1, wherein
    the prism portion has a facing surface facing the ejection surface,
    an angle formed between the facing surface and a normal direction with respect to a flat surface formed by the flat portions is defined as $\delta$, an angle formed between the emission light emitted outward from the ejection surface and the normal direction is defined as $\theta_2$, and the facing surface satisfies a relationship of $\delta \geq \theta_2$.

14. The optical member according to claim 1, wherein at least a part of the prism portions has a trapezoidal shape with a top side adjacent to the ejection surface.

15. The optical member according to claim 14, wherein each of the prism portions has a trapezoidal shape with a top side, one of the prism portions has a first end point that is an end point of the ejection surface adjacent to the flat portion, another prism portion adjacent the one of the prism portions has a second end point that is an end point of the top side opposite to the ejection surface, an angle $\varepsilon$ is formed by a virtual straight line connecting the first end point and the second end point and a normal direction with respect to a flat surface formed by the flat portions, an angle $\theta_2$ is formed by an emission light emitted outward from the emission surface and the normal direction, and the prism portion having the trapezoidal shape satisfies a relationship of $\varepsilon > \theta_2$.

16. The optical member according to claim 1, wherein the first surface along which the first prism portions are arranged is not flush with the incident portion along which the second prism portions are arranged.

17. The optical member according to claim 1, wherein the second prism portions are located adjacent to each other without a flat portion.

18. The optical member according to claim 1, wherein the incident portion is an outer surface that connects the first surface and the second surface.

19. The optical member according to claim 18, wherein the incident portion is opposite to a third surface, through which a part of the incident light that is repeatedly reflected by the reflection surface and the second surface, and does not reach the prism portion, escapes to the outside as afterglow.

* * * * *